(12) United States Patent
Nomura et al.

(10) Patent No.: US 6,421,509 B1
(45) Date of Patent: Jul. 16, 2002

(54) INFORMATION DISPLAY SYSTEM AND IMAGE FORMING APPARATUS

(75) Inventors: Tatsuo Nomura, Souraku-gun; Mitsukazu Okuda, Ikoma; Kouki Fukuda, Nara; Yuji Okamoto, Souraku-gun; Syoichiro Yoshiura, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/718,784

(22) Filed: Nov. 22, 2000

(30) Foreign Application Priority Data

Nov. 26, 1999 (JP) ............................. 11-336360

(51) Int. Cl.[7] .......................... G03G 15/00; G06F 3/14
(52) U.S. Cl. ........................................ 399/81; 345/700
(58) Field of Search .................... 399/81, 82, 85; 358/501, 401, 296; 345/700

(56) References Cited

U.S. PATENT DOCUMENTS 5,517,316 A * 5/1996 Hube ........................ 358/296
5,878,302 A * 3/1999 Inui et al. .................. 399/81
5,969,826 A * 10/1999 Dash et al. ................ 399/81 X
6,185,379 B1 * 2/2001 Lay et al. .................. 399/81 X

FOREIGN PATENT DOCUMENTS

| JP | 04-332068 | * 11/1992 |
| JP | 08194588 | 7/1996 |
| JP | 10032664 | 2/1998 |

* cited by examiner

*Primary Examiner*—Sophia S. Chen
(74) *Attorney, Agent, or Firm*—Dike, Bronstein, Roberts & Cushman IP Group Edwards & Angell, LLP; David G. Conlin; David A. Tucker

(57) ABSTRACT

An information display system capable of displaying the instruction input frame(basic frame) for allowing instructions of conditions of an arbitrary processing job to be input therethrough and the status confirmation frame (job status frame) for allowing the status of an arbitrary processing job to be checked is characterized in that with the basic frame preferentially displayed, a job list area that presents brief content of a processing job displayed in the job status frame can be displayed along with the basic frame.

24 Claims, 23 Drawing Sheets

(Overall view of the control panel)

(Print status frame)

(Copy job registration)

FIG. 9 (Copy density setup)

FIG. 10 (Copy paper setup)

FIG. 11 (Copy magnification setup)

FIG. 13 (With 3 print jobs)

(Copy job completed with 2 jobs)

FIG. 15 (Copy job completed with 2 jobs)

FIG. 16 (Interrupt mode with 3 jobs put lower)

FIG. 17 (Interrupt job registration)

(Basic fax frame)

FIG. 19

(Fax status frame)

| USER/MODE | SET TIME | SETS | STATUS |
|---|---|---|---|
| 1 ☎ 0123456789 | 14:35 12/09 | 003/010 | RCV. |
| 3 ☎ ****** | 14:37 12/09 | 000/003 | WAITING |
| 3 ☎ 0123456789 | 14:38 12/09 | 000/010 | WAITING |
| 4 ☎ 5678901234 | 14:37 12/09 | 000/003 | WAITING |

JOB QUEUE ◆ COMPLETE    PRIORITY    STOP/DELETE

◀ ▶  1/1

PRINT JOB    FAX JOB    E-MAIL JOB

INFORMATION DISPLAY SYSTEM AND IMAGE FORMING APPARATUS

BACKGROUND OF THE INVENTION (1) Field of the Invention

The present invention relates to an information display system capable of simultaneously displaying a multiple number of frames, and in particular relates to an information display system for an information processing apparatus which, when the apparatus has been previously reserved for a multiple number of information processing jobs, can effect the reserved information processing jobs.

(2) Description of the Prior Art

There have been image processing apparatus which have a display unit (e.g., dot matrix display device) capable of displaying not only numeric characters and symbols, but also Japanese syllabaries, Chinese characters, alphabet and other images. The display unit in such an image processing apparatus is adapted to be able to display the status frame (status confirmation frame) for showing the status of the information processing apparatus and an input setup frame (instruction input frame) with which the processing conditions and processing method are designated. Since these frames can be displayed, it is possible to perform smooth input of the conditions and it is possible for the user to confirm the status of the information processing apparatus, i.e., the contents of the processing job being currently executed and the contents of the processing jobs which are not currently being executed but have been reserved, in a list form.

As an example of techniques of this kind, those disclosed in Japanese Patent Application Laid-Open Hei 8 No.194588 (will be mentioned as prior art 1) and Japanese Patent Application Laid-Open Hei 10 No.32664 (will be mentioned as prior art 2) can be referred to.

Prior art 1 is to provide a printer and printing job display method which can present the processing status of printing jobs and processing result at any time it is requested by the user and allows the user to readily check what order in the queue of jobs the wanted print job is located. This printer includes a job display control means for displaying on the display individual job information of the print data files sequentially input and the status information of the print result corresponding to each job. This job display control means is adapted to display on the display the list of a predetermined number, dependent upon the display capacity, of the latest job information and the status information of print results, in accordance with the display request.

Prior art 2 is to perform total management of a variety of jobs in an image forming system connected to a network so as to realize efficient use of the image forming system. This image forming system manages the data concerning the system status and the jobs received thereby and displays them on the display means. In this system, the name of the user who has requested the designated job or other information is displayed so as to allow change of the output order and/or other job settings or cancellation of a job by means of key input control.

However, it is impossible for the conventional display means including the above prior arts 1 and 2 to have a large display area because of the structure of the image forming apparatus. Therefore, either the status confirmation frame or the instruction input frame is displayed by switching the display from one to the other as appropriate. When the status needs to be checked, the status confirmation frame is displayed on the display screen while the instruction input frame is displayed when instructions of the conditions and setup etc. are given. That is, the content on the display screen must be completely changed over.

In this case, when many pieces of status information should be handled as in an information processing apparatus connected to a network, or when the information processing apparatus is of a composite type (multi-functional type) which has multiple functions and hence needs to be provided with setup data and instructions of conditions for each function, it is difficult for the user to remember the information displayed on the previously displayed frame, posing the problem of a hold up during the input, etc. of new instructions.

For example, an information processing apparatus which handles multiple pieces of information received via a number of input interfaces via networks, may be supplied with new pieces of information (commands of new processing jobs) after the status of the information processing apparatus has been checked through the status confirmation frame whilst continuing the processing in accordance with the content of the received information. Therefore, in order to realize the grasp of the certain processing job and the inputting of the instruction for the user, the information processing apparatus of this kind needs to continuously provide the user with new information (the progress status of the processing job) so that the user is able to readily access the latest information.

However, as to the conventional information processing apparatus, there is a limit to the frame size of the display means as stated above, so that the status confirmation frame and the instruction input frame should be totally switched from one to the other. As a result, it has been impossible for the user to check the latest information and grasp the status of the information processing apparatus at the same time.

SUMMARY OF THE INVENTION

The present invention has been devised in order to solve the above problems, and it is therefore an object of the present invention to provide an information display system and image forming apparatus, which are incorporated in an information processing apparatus capable of having multiple information processing tasks to be reserved and executing the reserved information processing tasks and which can display the contents (information outlines) of the multiple frames on the display area, even though it is limited, to provide the user with the displayed information at the same time.

In order to achieve the above object, according to one feature of the present invention, an information display system capable of displaying multiple frames is characterized in that when a subsequent frame is overlaid on a preceding frame, a summary display area that presents the summary of the information displayed in the preceding frame is displayed along with the subsequent frame. According to the present invention having the above feature, even with the subsequent frame displayed, a summary display area that presents the summary of the information displayed in the preceding frame is displayed along with the subsequent frame. Therefore, even with the subsequent frame displayed, it is possible to grasp the content of the preceding frame which is hidden by the subsequent frame. Thus, it is possible to easily grasp the total status of image information being displayed.

The present invention of the above configuration is further characterized in that the preceding frame has as part thereof the summary display area that presents the summary of the information displayed in the frame thereof and when the subsequent frame is displayed, the latter frame is overlaid on the preceding frame while the summary display area is kept as the background as it is. According to the present invention having this feature, when the subsequent frame is displayed and overlaid on the preceding frame, the summary display area of the preceding frame is kept as the background as it is. Therefore, even with the subsequent frame displayed, it is possible to grasp the content of the preceding frame which is hidden by the subsequent frame. Thus, even when multiple images are displayed laid one over another, it is possible to easily grasp the total status of images being displayed.

The present invention according to each of the above configurations is further characterized in that the summary display area is enabled to disappear and can be displayed again. According to the present invention having this feature, since displaying the summary display area is meaningless if, for example the preceding frame does not have any substantial information displayed, it is possible to remove the summary display area. Conversely, the summary display area can be displayed again when the information in the preceding frame need be examined.

In accordance with the invention, an information display system capable of displaying an instruction input frame for allowing instructions of conditions of a desired processing job to be input therethrough and a status confirmation frame for allowing the status of an arbitrary processing job to be confirmed, is characterized in that with the instruction input frame preferentially displayed, a processing job summary area, that presents the summary of the processing job conditions displayed in the status confirmation frame can be displayed along with the instruction input frame. According to the present invention having this feature, with the instruction input frame displayed, the processing job summary area that briefly presents the content of the processing job being displayed in the status confirmation frame can be displayed at the same time. Therefore, the contents of the processing jobs having been input already can be reviewed by the processing job summary area even when the instruction input frame is displayed to allow new instructions to be input. As a result, it is possible to confirm the current status of the information processing apparatus at any time while new input can be given whilst confirming the status of the information processing apparatus.

The present invention of the above configuration is further characterized in that the status confirmation frame includes as part thereof the processing job summary area as a processing job list area for briefly displaying the conditions of the processing jobs while the instruction input frame is displayed so as to be overlaid on the status confirmation frame with the processing job list area kept as the background as it is. According to the present invention having this feature, the status confirmation frame includes as part thereof the processing job summary area as a processing job list area while the instruction input frame is displayed so as to be overlaid on the status confirmation frame with the processing job list area kept as the background as it is. Therefore, the contents of the processing jobs having been input already can be reviewed by the processing job list area in the status confirmation frame even when the instruction input frame is displayed to allow new instructions to be input. As a result, it is possible to confirm the current status of the information processing apparatus at any time while new input can be given whilst confirming the status of the information processing apparatus.

The present invention of the above configuration is further characterized in that the processing job summary area is displayed as part of the instruction input frame. According to the present invention having this feature, since the processing job summary area is displayed as part of the instruction input frame, the summary of the display of the status confirmation frame can be reviewed.

The present invention according to each of the above configurations,is further characterized in that the processing job summary area can be made to disappear and appear again. There are cases where display of the processing job display area along with the status confirmation frame is meaningless when, for example, no processing job reservation is made. Accordingly, in the present invention having the above feature, the summary display area can be removed. On the contrary, there are cases where the operator needs to confirm that there is no processing job reservation while engaged in the status confirmation frame. In such a case, the processing job display area can be displayed again.

The present invention according to each of the above configurations is further characterized in that icons representing the contents of processing jobs are displayed in the processing job list area. According to the present invention having this feature, it is possible for the operator to confirm the contents of processing more easily and exactly.

The present invention of the above configuration is further characterized in that icons representing the contents of processing jobs are displayed in the order in which the processing jobs are to be executed. According to the present invention having this feature, since icons representing processing jobs are displayed in the order in which the processing jobs are to be executed, the operator, having confirmed the status of the information processing apparatus, is able to give instructions of a new processing job and confirm the reception of the new instructions (the order of processing) at the same time.

The present invention according to each of the above configurations is further characterized in that when instructions of a new processing job are input through the instruction input frame and the processing job is confirmed, an icon representing the new processing job is additionally displayed in the processing job list area. According to the present invention having this feature, the operator, having confirmed the status of the information processing apparatus, is able to give instructions of a new processing job and confirm that the information processing apparatus has accepted the instructions of the new processing job, at the same time.

The present invention according to each of the above configurations is further characterized in that icons displayed in the processing job list area are displayed in such a manner that the operator can know whether a job is being executed or before execution and that a job is that which has been lust additionally reserved. According to the present invention having this feature, the user is able to recognize the current operation status of the information processing apparatus more easily and exactly by merely looking at the processing job list area.

The present invention of the above configuration is further characterized in that when referring to the icon representing a processing job before execution as the basic form, the icon representing the same processing job during execution is displayed by highlighting the basic form with black and white reversed and the icon representing the same job which has been just additionally reserved is displayed by flashing the basic form or by the rotation of the basic form. According to the present invention having this feature, it is possible to display the states of a processing job distinctively, between that before execution, during execution and that where the job has been just additionally reserved, without changing the icon shape, so that the user is able to recognize the status of a processing job more easily and exactly.

The present invention according to each of the above configurations is further characterized in that the instruction input frame can be made to disappear and can be displayed again even during execution of any processing job. According to the present invention having this feature, the instruction input frame can be made to disappear and can be displayed again even during execution of any processing job. Thus, depending upon the user's desire, it is possible to cancel the instruction input frame and preferentially display the status confirmation frame even while a job is being executed in the image processing apparatus. Therefore, the operator is allowed not only to roughly know the contents of processing jobs from their icons but also confirm the details from the status confirmation frame, as necessary. Conversely, even when status confirmation frame is displayed to check the processing job detail with the instruction input frame temporarily deleted, the original instruction input frame can be displayed again as appropriate if required when instructions of a new job need be given or in other cases. As a result, the operator, after having confirmed the details of the contents of processing jobs already set up, is able to give instructions of a new job whilst recognizing the status of the processing jobs in progress.

The present invention according to each of the above configurations is further characterized in that the status confirmation frame is displayed at a fixed position. According to the present invention having this feature, since the instruction input frame is displayed laid over the status confirmation frame which is basically displayed at a fixed position, the operator is able to input instructions of a new processing job whilst recognizing the presence of the processing jobs already set up. Further, since the display position is fixed, the user is able to readily know that the information processing apparatus has receives user's instructions of a new processing job.

The present invention according to each of the above configurations is further characterized in that the instruction input frame is displayed necessarily when instructions of a new processing job are given. According to the present invention having this feature, the instruction input frame is displayed necessarily when instructions of a new processing job are input. Therefore, when, for example, instructions of performing a copying operation is given with the status confirmation frame displayed, the instruction input frame is automatically displayed without giving any input indicating display of the instruction input frame. As a result, it is possible to positively confirm the instructions newly input to the information processing apparatus even with the instruction input frame undisplayed.

The present invention according to each of the above configurations is further characterized in that, where there are multiple processing modes, the status confirmation frame displays the status of processing jobs for each processing mode. The invention is characterized in that, where the multiple processing modes include a transmission mode for transmitting information and an output mode for outputting information, the reservation status of processing jobs as to information transmission is displayed in the processing job list area of the status confirmation frame when instructions for processing jobs in the transmission mode given through the instruction input frame. The invention is further characterized in that the transmission mode for transmitting information includes a facsimile mode for transmitting information via general telephone lines and an e-mail mode for transmitting information by way of internet e-mail. According to the inventions having the above features, when the information processing apparatus incorporates multiple processing modes, the status confirmation frame will display the status of processing jobs for each processing mode. For example, when the multiple processing modes include the transmission mode for transmitting information and the output mode for outputting information and further the transmission mode has two modes, i.e. the facsimile mode and the e-mail mode, the reservation status of processing jobs are displayed for each of the modes. In the above way, the status of the information processing apparatus as to the mode in-which instruction is going to be given is displayed, so that the operator is able to give new instructions to the apparatus whilst confirming the status of the information processing apparatus.

The present invention according to each of the above configurations is further characterized in that an image forming apparatus includes any of the above information display systems. This image forming apparatus is characterized by having the function of being able to be connected to networks. The image forming apparatus is further characterized in that at least two functions of copier, facsimile and printer functions and these functions can be changed one from another. Moreover, the image forming apparatus is characterized by having the internet facsimile function for enabling transmission and reception of information by way of e-mail. According to the inventions having the above features, it is possible for the operator to grasp the current status of the image forming apparatus even if instructions of multiple image forming jobs are input and to confirm each of the image forming jobs. Thus, the configuration makes it possible to enable more exact designation of image forming.

BRIEF DESCRIPTION OF THE DRAWINGS

FIG. 19 is an illustrative view of a display frame example of the display portion, showing the fax status frame;

DESCRIPTION OF THE PREFERRED EMBODIMENTS

The embodiments of the present invention will hereinafter be described in detail with reference to the accompanying drawings.

The information display system according to the present invention is preferably applied to those systems which are able to display a multiple number of frames in parallel. Each frame has a summary display area indicating the roundup of the contents displayed on the frame so that when a second frame is displayed laid over a first frame, the second frame will be displayed with the summary display area of the first frame kept displayed.

In the present embodiment, a case where this information display system is provided in an information processing apparatus will be described. More specifically, a case where this information display system is provided for a composite type image forming apparatus as an image processor connected to a network and having multiple functions.

Figure 1:
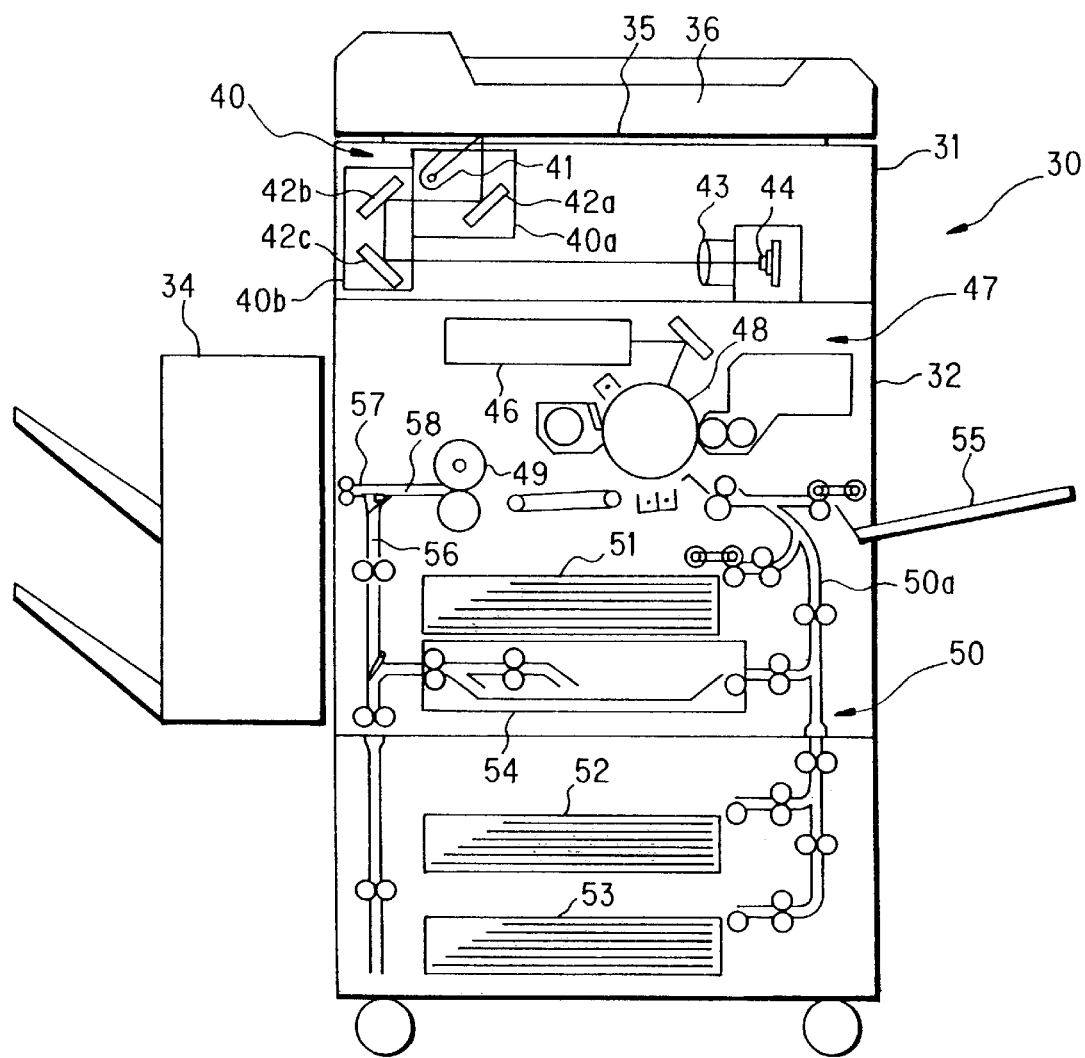
FIG. 1 is a schematic sectional view showing an overall configuration of a digital copier as an image forming apparatus of the present invention.

FIG. 1 is a schematic sectional view showing the overall configuration of a digital copier as the above image forming apparatus.

This digital copier is mainly composed of a scanner portion 30 and a laser printer portion 32.

Scanner portion 30 includes: an original table 35 of transparent glass; a reversing automatic document feeder (RADF) 36 for conveying and feeding originals automatically onto original table 35; and an original image reading unit (scanner unit) 40 for reading by scanning the image of the original placed on original table 35.

The original image scanned by this scanner portion 30 is sent as image data to an aftermentioned image data input portion, where the image data is subjected to predetermined image processing.

A paper storage and conveyer portion 50 includes: a first cassette 51; a second cassette 52; a third cassette 53; a duplex copy unit 54; and a multi-size manual feed tray 55.

Stored in each of cassettes 51 to 53 in this paper storage and conveyer portion 50 is a bundle of sheets of a different size. When the user selects one cassette which holds the paper the user needs, the paper is delivered out, sheet by sheet, from the stack of paper in the selected cassette and is sequentially conveyed through a conveyance path 50a toward the image forming portion of laser printer portion 32.

RADF 36 is a device which has a number of documents placed at a time on a predetermined document tray thereof and the documents automatically fed one by one onto document table 35 of scanner unit 40. In order to allow scanner unit 40 to read one side or both sides of documents in accordance with the operator choice, this RADF 36 also includes a one-sided document feed path and a dual-sided document feed path and a feed path switch for switching the feed from one to the other. Concerning RADF 36, since there have been many types proposed and commercialized, the detailed description is omitted herein.

Scanner unit 40 includes: a lamp reflector assembly 41 for exposure of the document surface; a photoelectric transducer (CCD) 44 for converting the reflected light image from the original into electric image signals; a first scan unit 40a made up of a first reflection mirror 42a for directing the light image from the original toward photoelectric transducer (CCD) 44; a second scan unit 40b made up of a second reflection mirror 42b and a third reflection mirror 42c for directing the further reflected light image of the original toward photoelectric transducer (CCD) 44; and an optical lens element 43 for focusing the light on photoelectric transducer (CCD) 44.

In association with the actions of RADF 36 and scanner unit 40, the originals to be read are successively placed onto original table 35 by RADF 36 and scanner portion 31 reads the original image by moving scanner unit 40 along the undersurface of original table. The image data obtained by reading the original image with scanner unit 40 is sent to an aftermentioned image processor, where the data is subjected to various treatments. Then the processed image data is supplied to a laser writing unit 46 of laser printer portion 32, which in turn forms a static latent image on a photosensitive drum 48. The latent image on the photosensitive drum is developed by the electrophotographic process into a visual image, which in turn is transferred to the paper.

Laser printer portion 32 includes laser writing unit 46 and electrophotographic processing portion 47 for forming images.

Laser writing unit 46 includes: a semiconductor laser for emitting laser beams in accordance with the image data from the aforementioned memory; a polygon mirror for deflecting the laser beam at an equiangular speed; and an f-theta lens for correcting the equiangularly deflected laser beam so that the laser spot focused on the photosensitive drum 48 surface of electrophotographic processing portion 47 will move at a constant speed.

As well known, electrophotographic processing portion 47 includes: photosensitive drum 48; a charger, a developing unit, a transfer unit, a separating unit, a cleaning unit, an erasing unit, all being arranged around photosensitive drum 48; and a fixing unit 49. Provided on the downstream side of fixing unit 49 with respect to the conveying direction of the paper to be image formed, is a paper discharge path 58. This paper discharge path 58 branches into two paths, namely, a conveyance path 57 connected to a post-processor 34 and a conveyance path 56 connected to duplex copy unit 54.

Concerning laser writing unit 46 and electrophotographic processing unit 47, the image data loaded from the image memory is supplied to laser writing unit 46, which scans the laser beam being modulated based on the image data to create a static latent image on the photosensitive drum 48 surface. This latent image is developed with the toner into a toner image. The thus visualized toner image is electrostatically transferred to the paper which is being conveyed from the multi-layered paper feed unit, i.e., paper storage and conveyer 50 and fixed thereto.

The paper with the image thus formed is selectively conveyed from fixing unit 49, as it is sent to post-processor 34 by way of conveyance path 57 or to duplex copy unit 54 by way of conveyance path 56, The image processor in the digital copier 30 having the above configuration executes image processing on the read original image information. Next, the configuration and function of this image processor will be described.

Figure 2:
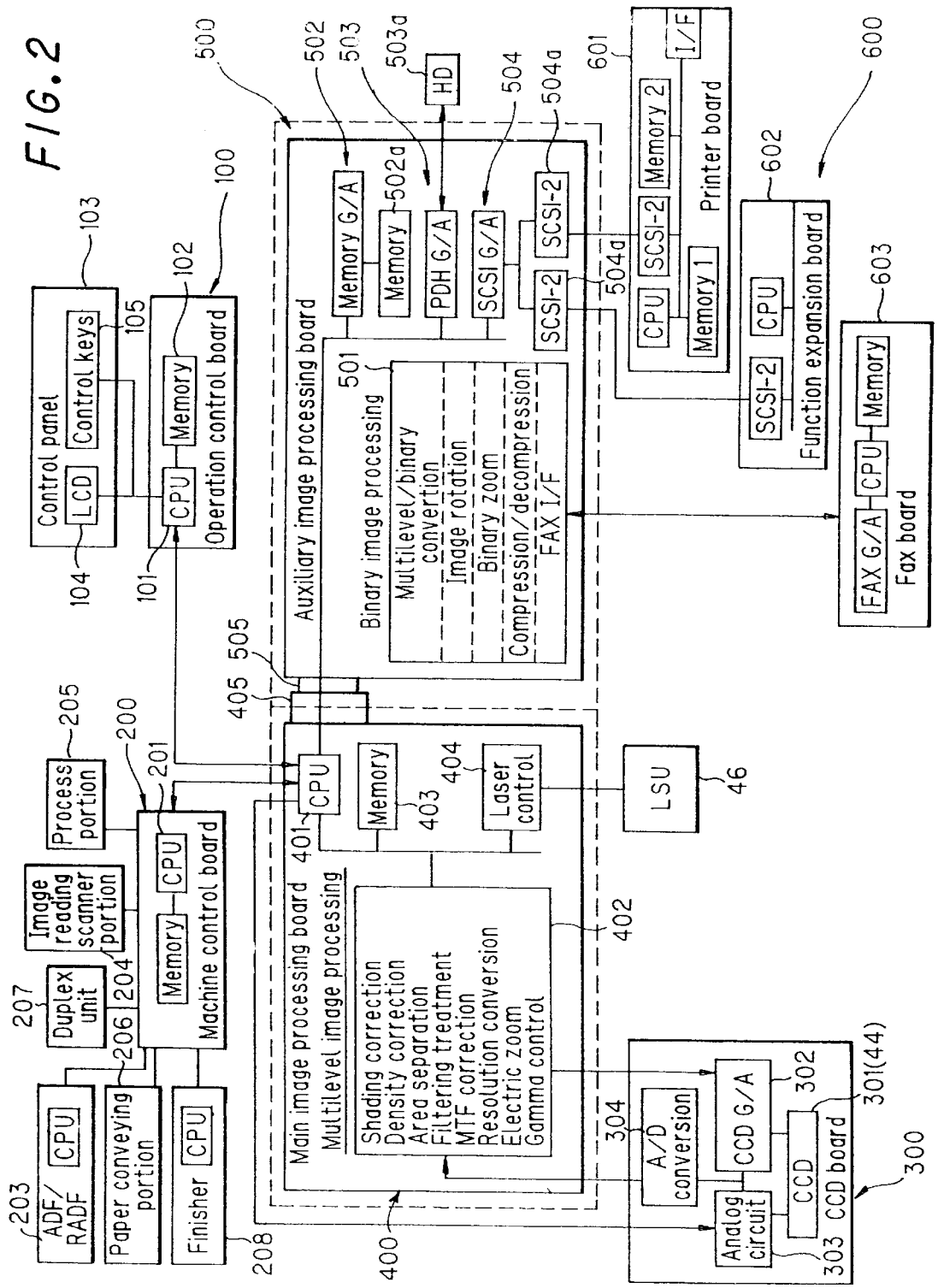
FIG. 2 is a block diagram showing the whole configuration including various units, an image processor etc. of the digital copier shown in FIG. 1.

FIG. 2 is a block diagram showing the whole configuration of digital copier 30 shown in FIG. 1, including various units and the image processor and the like, wherein a main central processing unit (CPU) 401 is linked with the auxiliary central processing units (CPUs) provided for the various units to govern their operation.

As seen from this block diagram, this image processor is mainly composed of: an operation panel board 100 for managing and controlling a control panel; a machine control board 200 for managing and controlling the various units constituting digital copier 30 (FIG. 1); a CCD board 300 for electrically reading the original image and converting it into electronic data; a main image processing board 400 for subjecting the electronic data converted from the original image through CCD board 300 to predetermined image processing; an auxiliary image processing board 500 for subjecting the image information having been processed through main image processing board 400 to additional predetermined image processing; and an expansion board group 600 (of printer board, fax board, function-expansion board) connected to auxiliary image processing board 500 via interfaces.

Management and control in each board will be described next.

Operation Panel Board 100

Operation panel board 100 is basically controlled by an auxiliary central processing unit (CPU) 101 and manages the display screen of a LCD display portion 104 arranged on a control panel 103, the control input through a control key group 105 that allows for input of designations and commands involved in the various modes. This operation panel board also has a memory 102 for storing various pieces of control information used in control panel 105 such as the data input through control key groups 105, the information to be displayed on the screen of LCD display portion 104 and the like.

In the above arrangement, auxiliary central processing unit(CPU) 101 communicates control data with main central processing unit(CPU) 401 so as to direct the operation of digital copier 30 (FIG. 1). Main central processing unit 401 transfers the control signal representing the operational state of digital copier 30 to central processing unit(CPU) 101, so as to inform the user of the operational state, i.e., in what state the machine is in, through the display screen of LCD display portion 104 on control panel 103.

Machine Control Board 200

Machine control board 200 is integrally controlled by an auxiliary central processing unit 201, so as to manage automatic document feeder 203 such as ADF, RADF or the like, an image reading scanner portion 204 for reading original images, a process portion 205 for reproducing the image from the image information, a paper conveying portion 206 for conveying the paper on which image is recorded, sheet by sheet, from the storage portion toward the process portion, a duplex unit 207 for inverting the paper having an image formed on one side thereof and conveying it so that images are formed on both sides of the paper, and a finisher 208 for effecting post-treatments such as stapling the image recorded sheets and other components.

CCD Board 300

CCD board 300 includes: a CCD 301 for electrically reading the original image; a circuit(CCD gate array) 302 for driving CCD 301; an analog circuit 303 for performing gain control of analog data output from CCD 301; and an A/D converter 304 for converting the analog output from CCD 301 into electronic data of digital signals. Control and management of this board is performed by main central processing unit 401.

Main Image Processing Board 400

Main image processing board 400 is controlled by main central processing unit 401 and reproduces, based on the electronic data of the original image transferred from CCD board 300, the original image with desired tones. For that purpose, this board includes: a multilevel image processor 402 for directly subjecting the multilevel image data to shading correction, density correction, area separation, filtering treatment, MTF correction, resolution conversion, electric zooming (magnification variation), gamma control and the like; a memory 403 for storing the processed image data and various control information such as processing sequence control etc.; a laser controller 404 for supplying laser writing unit 46 with the thus processed image information to reproduce the image; and the like.

Auxiliary Image Processing Board 500

Auxiliary image processing board 500 is connector-joined to main image processing board 400 and includes: a binary image processor 501 which is controlled by main central processing unit 401 on main image processing board 400; a memory 502a with gate array 502 for controlling memory 502a for storing and managing the binary image information having undergone the image processing and the control information etc., needed for processing; a hard disc 503a with a gate array 503 for controlling hard disc 503a which loads multiple number of original images repeatedly the number of times the copies are needed to produce multiple sets of prints and; a SCSI 504a as the external interface and a gate array 504 for controlling SCSI 504a.

The above binary image processor 501, as shown in the diagram, includes: a processor for converting the multilevel image information into binary image data; a processor for rotating images; a binary zooming processor for varying the size of binary images; and a processor for performing compression and decompression of the binary image data. This further has a fax interface for permitting transmission and reception of fax images by way of communication equipment.

Expansion Boards 600

Examples of expansion boards 600 include: a printer board 601 permitting the data transferred from a personal computer etc., to be output in the printer mode from laser printer portion 32 of digital copier 30 (FIG. 1); a function expansion board 602 for making the best use of digital copier 30 by expanding the editing function of digital copier 30; and a fax board 603 for transmitting original images read through scanner portion 31 of digital copier 30 to a remote site and reproducing, the images of the image information sent from the remote site by means of laser printer portion 32 of digital copier 30.

About the Processing Modes

Next, the image data processing and the flow of the image data in copy mode, fax mode and printer mode in the digital copier or image forming apparatus, will be described in detail with reference to FIGS. 1 and 2.

Copy Mode

The originals set in the predetermined position of RADF 36 of digital copier 30 are successively fed, one by one, onto original table 35 of scanner unit 40 so that the images of the originals are successively picked up by the above-described scanner unit 40 and transferred as 8-bit electronic data to main image processing board 400.

The 8-bit electronic data transferred to main image processing board 400 is subjected as the electronic image data of 8 bits to the predetermined processes through multilevel image processor 402. The 8-bit electronic image data having been processed through gamma control and other processes is sent to laser writing unit 46 by way of laser controller 404. In this way, the original image read by scanner portion 31 of digital copier 30 is output as a copy image with tones from laser recording portion 32.

Electronic RDH Function in Copy Mode

As above, the originals set in the predetermined position of RADF 36 of digital copier 30 are successively fed, one by one, onto original table 35 of scanner unit 40 so that the images of the originals are successively picked up by the above-described scanner unit 40 and transferred as 8-bit electronic data to main image processing board 400.

The 8-bit electronic data transferred to main image processing board 400 is subjected as electronic image data of 8 bits to the predetermined processes through multilevel image processor 402. The 8-bit electronic image data is then sent to the auxiliary image processing board 500 side by way of the joint between a connector 405 of main image processing board 400 and a connector 505 of auxiliary image processing board 500. In the board 500, the 8-bit electronic image data is processed through the multilevel/binary converter of binary image processor 501 where the data is converted into 2-bit electronic image data whilst being subjected to error diffusion and other processes.

The reason why the 8-bit electronic image data is subjected to error diffusion and other processes when it is converted into 2-bit electronic image data is to reduce the image degradation because mere execution of multilevel/binary conversion is not good enough in terms of image quality. The reason why the 8-bit electronic image data is converted into 2-bit electronic image data is to take the storage volume of images into consideration.

The thus converted 2-bit electronic image data of each original is transferred, page by page, to disc memory 503 such as hard disc and temporarily stored therein.

The set of originals placed in RADF 36 of digital copier 30 has been thoroughly read, the 2-bit electronic image data temporarily stored in hard disc 503 just above is repeatedly loaded the designated number of times, by gate array control. The loaded 2-bit electronic image data is sent to main image processing board 400 by way of the joint between connectors 405 and 505, then subjected to gamma control and other processes and further transferred to laser writing unit 46 by way of laser controller 404.

In the above description, the system is configured so that all the images of the set originals are read first and then the set of images is repeatedly loaded the number of times the copies are needed. However, it is possible to configure a system such that the first set of copies will be output when the predetermined number of images have been prepared. Thus, the original images read by scanner portion 31 of digital copier 30 are output from laser printer portion 32 as copied images with tones.

Printer Mode

Images sent from an external, networked, device such as a personal computer etc., are expanded pagewise on printer board 601, then the data is temporarily transferred by way of an interface, i.e., SCSI gate array 504, to the auxiliary image processing board 500 side, where it is stored into the memory such as hard disc 503a.

The images expanded pagewise on printer board 601 are sent to the auxiliary image processing board 500 side. In this case, however, the pagewise image is merely stored temporarily into hard disc 503a without execution of binarizing image processing. Further, when the page-wise images temporarily stored are loaded from hard disc 503a, no binarizing image processing of the pagewise images is carried out either.

The image information, temporarily stored in hard disc 503a, is loaded from hard disc 503a so that the loaded data is collated in the predetermined page order and transferred to main image processing board 400, where it is subjected to gamma control. The data is then supplied to laser controller 404 which in turn controls image writing of LSU 46 to perform image reproduction.

Fax Mode

The fax mode has two processes, the transmission of original images to the remote site and reception of original images from the remote site.

Description is first made on the transmission of images to the remote site. The transmission originals set in the predetermined position of RADF 36 of digital copier 30 is successively fed, one by one, onto original table 35 of scanner unit 40 so that the images of the transmission originals are successively read by the above-described scanner unit 40 and transferred as 8-bit electronic data to main image processing board 400.

The 8-bit electronic data transferred-to main image processing board 400 is subjected as the electronic image data of 8 bits to the predetermined processes through multilevel image processor 402.

Then the 8-bit electronic image data is sent to the auxiliary image processing board 500 side by way of the connection between connector 405 of main image processing board 400 and connector 505 of auxiliary image processing board 500. In board 500, the 8-bit electronic image data is processed through the multilevel/binary converter of binary image processor 501 where the data is converted into 2-bit electronic image data whilst being subjected to error diffusion and other processes.

The reason why the 8-bit electronic image data is subjected to error diffusion and other processes when it is converted into 2-bit electronic image data is to reduce the image degradation because mere execution of multilevel/binary conversion is not good enough in terms of image quality.

The thus binarized images of transmission originals are compressed in the predetermined format and stored in memory 502a.

When the procedure of transmission to the remote site is effected and when transmissible state is established, the images of the transmission originals being compressed in the predetermined format is read out from memory 502a and transferred to fax board 603, where necessary processes such as alternation of the compressing format are effected and the data is successively transmitted to the remote site via communication lines.

Next, description will made of how the original images transmitted from the remote site are processed.

When original images are transmitted via communication lines from the remote site, fax board 603 whilst performing the communication procedures, receives the original images being transmitted from the remote site. The received images which have been compressed in the predetermined format are sent via the fax interface provided in binary image processor 501 of auxiliary image processing board 500 to binary image processor 501, where the received data is processed through compression/decompression processor and the like so as to be reproduced as pagewise original images.

The data of the reproduced pagewise original images is transferred to the main image processing board 400 side, where it is subjected to gamma control. The data is then supplied to laser controller 404 which in turn controls image writing of LSU 46 to perform image reproduction.

As is understood from the above configuration, the image processor for subjecting the image information to the predetermined processes is mainly configured of two parts: main image processing board 400 which processes the original images captured by scanner portion 31 as multilevel image information; and auxiliary image processing board 500 which binarizes the original image information processed as multilevel image information through main image processing board 400 and subjects the image information transmitted from a device connected to the external interface to the predetermined processes and transfers the processed data to the multilevel image processor (main image processing board 400) side.

Main image processing board 400 has laser controller 404, which controls writing of image information by laser writing unit 46 in order to make laser writing unit 46 reproduce the image on photosensitive drum 48 based on the electrophotographic process.

By this arrangement, the original image captured through scanner portion 31 can be reproduced as a duplicated image by laser printer portion 32 without any loss of the properties the original has as a multilevel image. Further, when a large amount of originals need to be processed and output at high speed using the electronic RDH function etc., auxiliary image processing board 500, hard disc 503a, etc. are used to deal with this.

Further, processing of the image information and its output for the external devices such as fax, printer and the like, particularly for fax, the binarization of the transmission originals having been subjected to multilevel image processing (having the properties of the original image preserved), can be performed appropriately making use of the functions of digital features provided for digital copier 30.

Since the image processing functions are adapted to be made by multiple parts of image processors, it is possible to produce various models as a digital copier 30 series. That is, a desired digital copier meeting the user's needs can be installed and it is also possible to easily develop or expand the equipment after installation in answer to the user's request.

Since, in the above configuration, central processing unit 401 provided on main image processing board 400 also manages and controls auxiliary image processing board 500, the image that is processed sequentially through individual processors can be totally controlled so that the data and processes flow smoothly (without any loss of image data).

About the Network Environment

Figure 3:
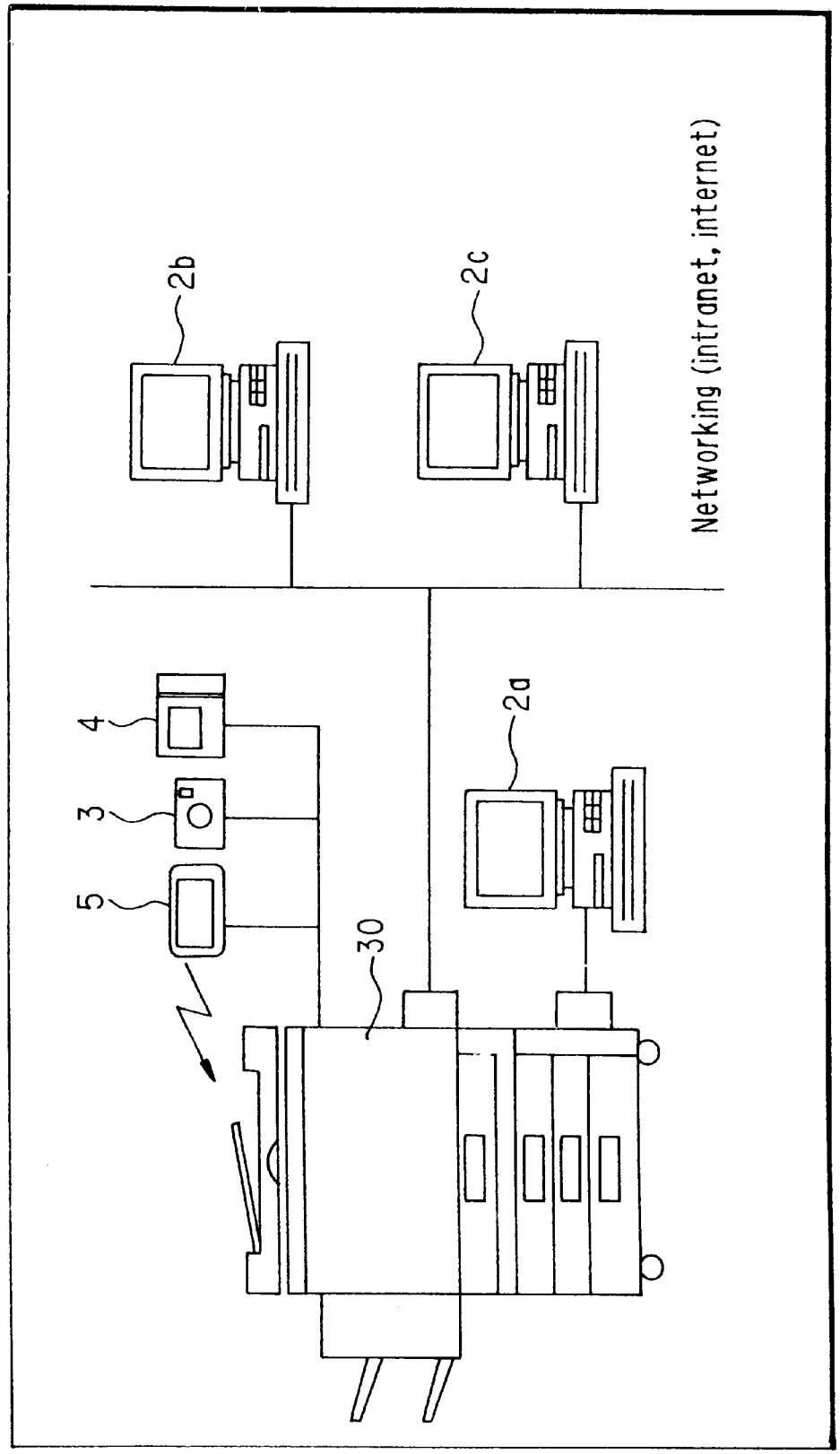
FIG. 3 is a diagram showing the network environment of an image forming apparatus.

FIG. 3 is a diagram showing the network environment of the image forming apparatus.

Under the network environment shown here, personal computers 2a to 2c and information processing apparatus 3 to 5 as of a portable peripheral type are connected other than digital copier 30. These apparatus are networked by network cables with the communications protocol established so that the data can be transferred from each to the other.

For example, when the data prepared by personal computer 2b is printed out through digital copier 30, the operator gives a printout command on the personal computer 2b side. In response to this command, it is checked whether the data from personal computer 2b side is output-enabled by digital copier 30. If the judgement is affirmative (output-enabled), the data is transmitted as a print job. Digital copier 30 expands the transferred data and outputs it through laser printer portion 32. During this operation, personal computer 2b obtains the status of digital copier 30, the status of the proceeding of the print job and other states by way of the network cable and displays the states for the operator.

In this way, the image forming apparatus of this embodiment serves as a multifunction machine that incorporates copier, fax and printer functions, preferably having internet-fax function which allows information communications by e-mail, and is connected to the network so as to exchange information between the data processing devices of various types on the network.

Figure 4:
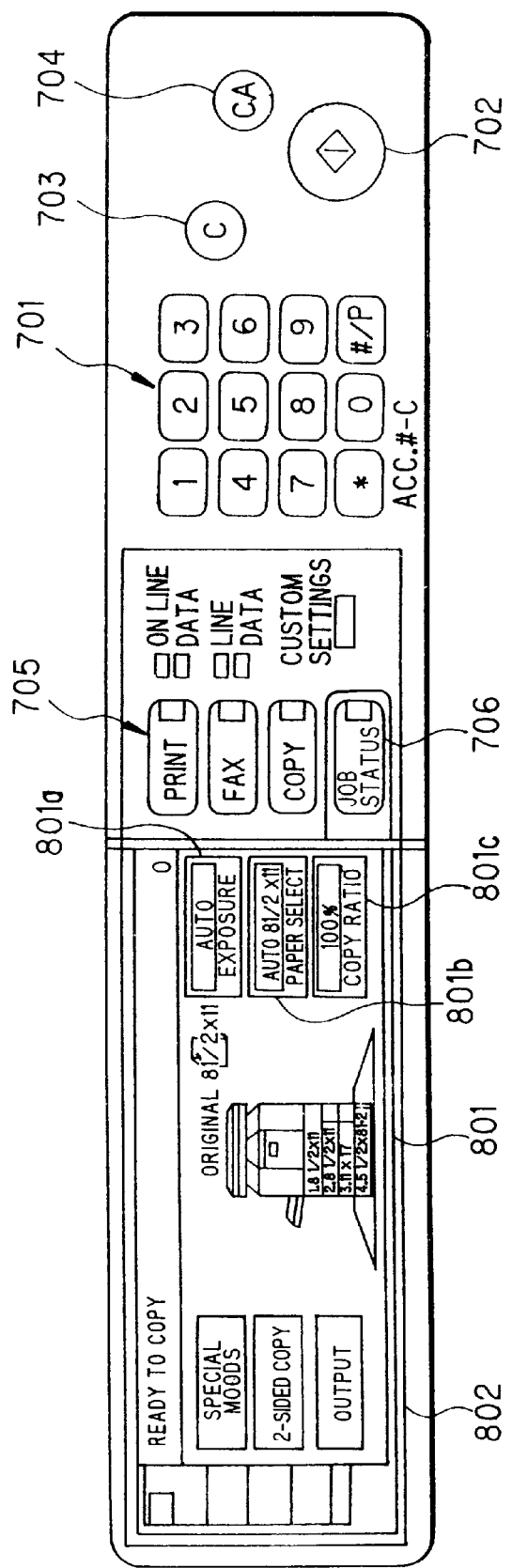
FIG. 4 is an illustrative view showing the entire part of a control panel.

The information display system according to the present invention is equipped for the image forming apparatus having the above configuration and is provided as a control panel which is constituted of, as shown in FIG. 4, for example, a display portion which can display not only numeric characters and symbols but also images and a control portion allowing for control and management such as input of setup, conditions of the image forming apparatus and input of processing job commands.

As the display portion of this control panel, a dot-matrix display device is preferably used. Specifically, a LCD panel can be mentioned. This display portion is preferably of a touch screen. With a touch screen configuration, input can be made by simply touching the necessary spot in the display on the screen even if the input of instructions to the information processing apparatus is complicated. Therefore, this provides a user-friendly input device. Further, no complex keys are needed for the control portion, so that it is possible to simplify the control portion, minimizing its configuration. In some embodiments, it is possible to completely eliminate the control portion.

This control portion can be configured as appropriate, depending upon the configuration of the image processing apparatus and should not be particularly limited. For the image forming apparatus of a multifunction type of the present invention, the control portion includes: as shown in FIG. 4, a ten key pad 701 for inputting the number of image forming, the number of copies, etc.; a start key 702 for actuating the image forming operation; a clear key 703 for clearing the input information; a reset key (CA key) 704 for clearing all the setup conditions; a function selecting key 705 for selecting the desired function among copy, printer, fax and/or other functions; and a job status key 706 for selectively making the current image forming job status display.

Figure 5:
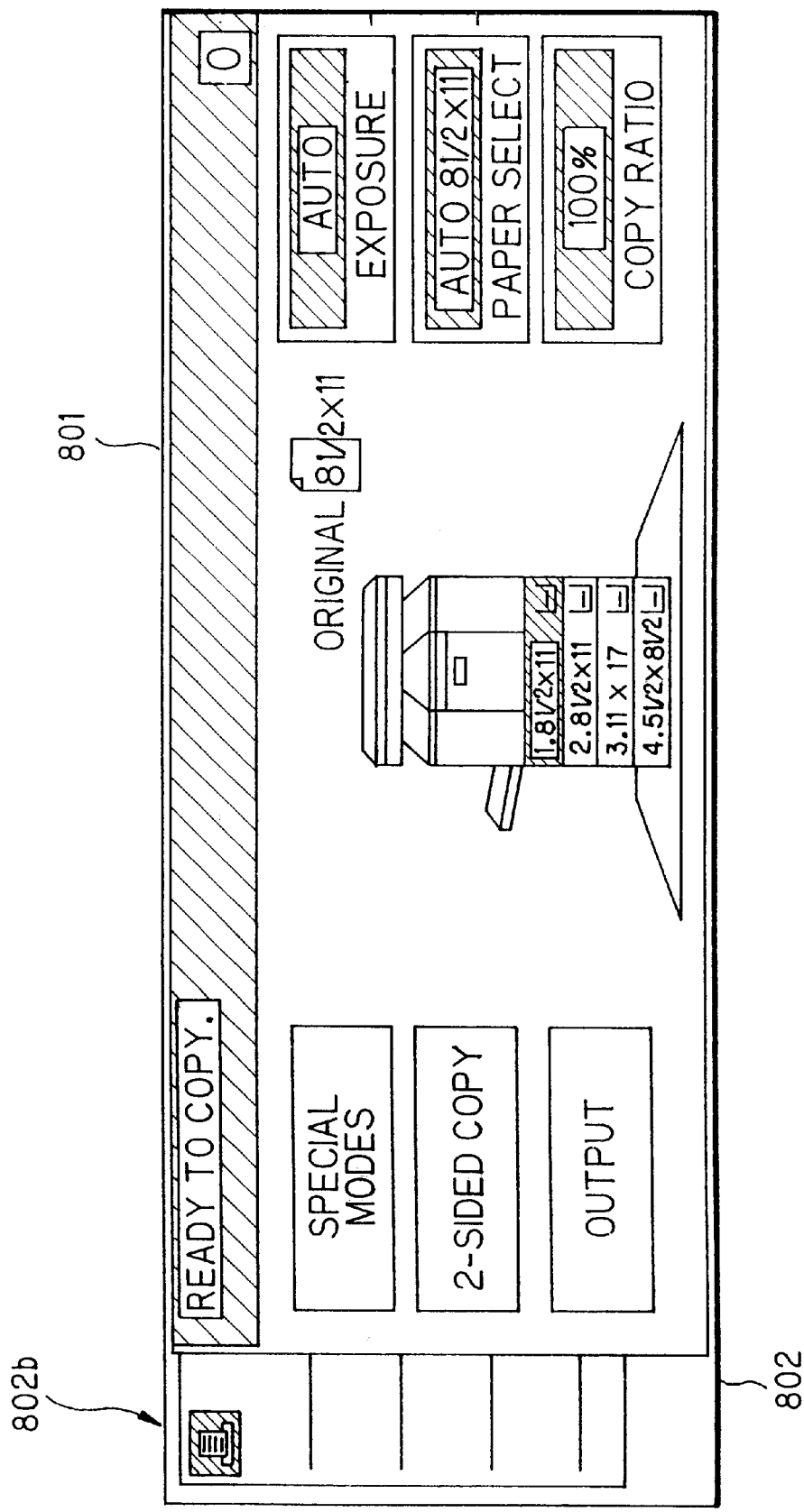
FIG. 5 is an illustrative view of a display frame example of the display portion, showing the basic copy frame.
Figure 6:
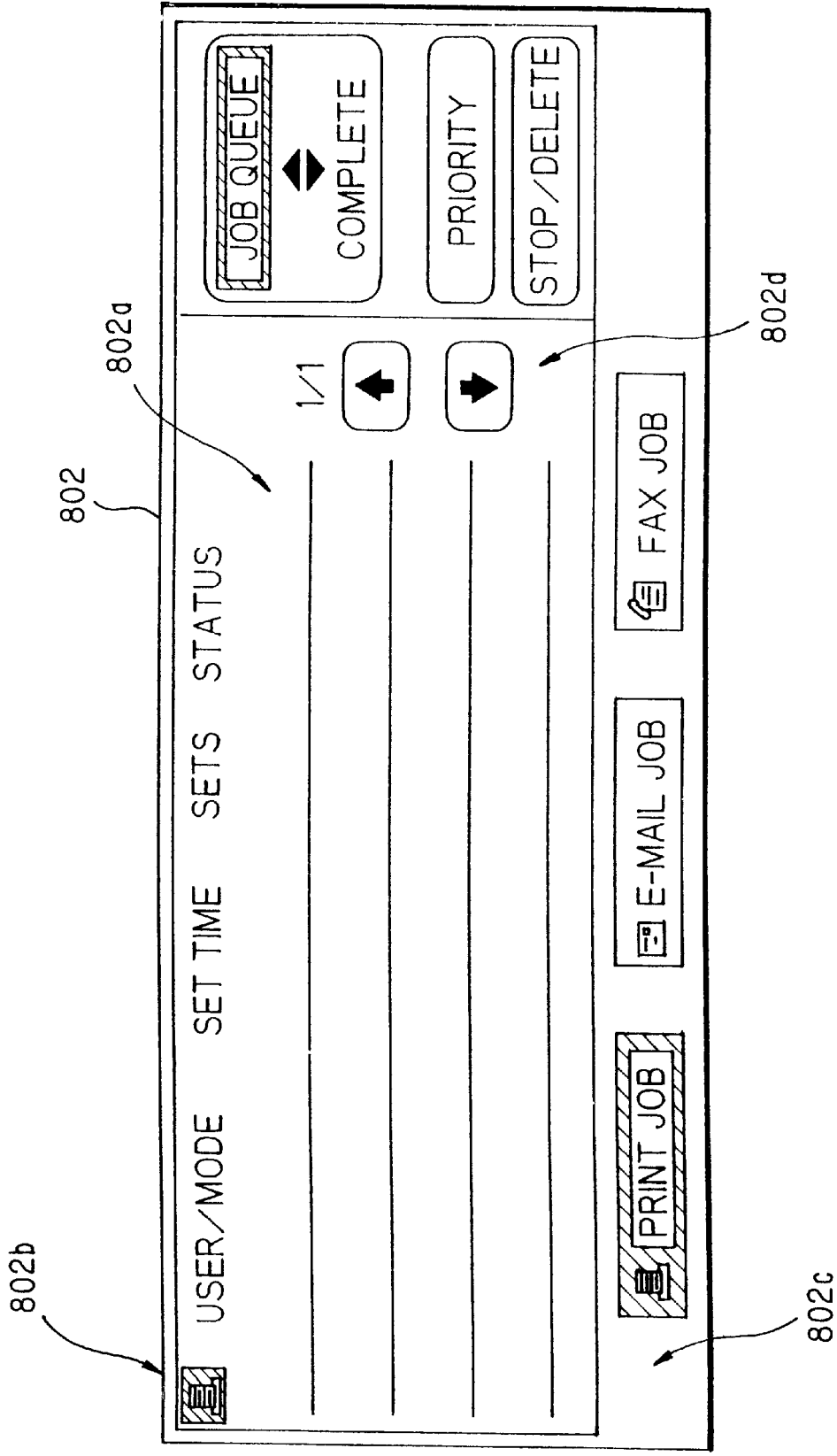
FIG. 6 is an illustrative view of a display frame example of the display portion, showing the print status frame.

In the information display system according to the present invention, two frames can be displayed in the display portion, namely, an instruction input frame 801 for allowing the operator to input the setup conditions of image forming in the image forming apparatus and a status confirmation frame 802 for allowing the operator to check the operating status of the image forming apparatus. Illustratively, as shown in FIG. 4 or 5, the basic frame is displayed as instruction input frame 801 and the job status frame is displayed as status confirmation frame 802, as shown in FIG. 6 by inputting the predetermined instruction.

The configuration of basic frame 801 is not particularly limited. For example, the basic frame in copy mode includes, as shown in FIG. 4, an external outline of the whole apparatus with indication of the current apparatus conditions and condition setup keys for designating copying conditions such as a copy density selecting key 801*a*, copy paper selecting key 801*b*, a copy magnification selecting key 801*c*, etc.

Figure 9:
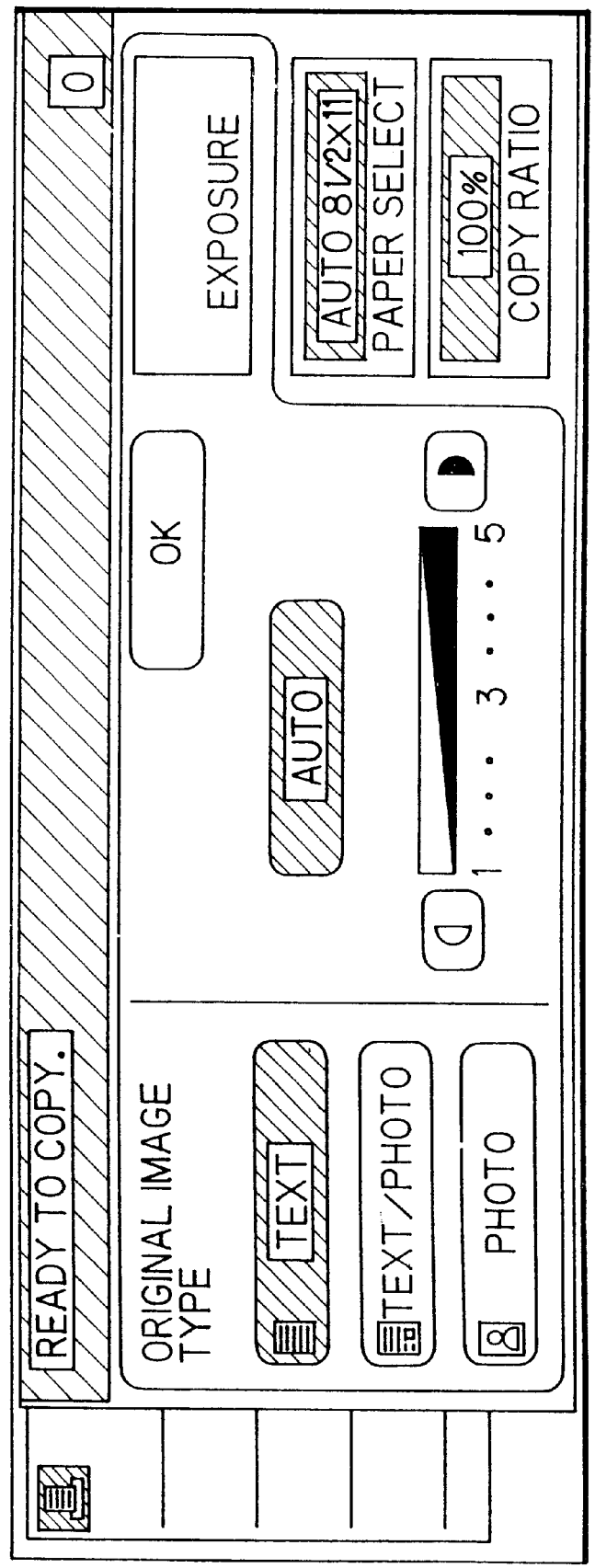
FIG. 9 is an illustrative view of a display frame example of the display portion, showing the copy density setup frame.

When copy density selecting key 801*a* (FIG. 4) in basic frame 801 is pressed (operated), the display changes from the basic frame to the density setup frame as shown in FIG. 9. In the density setup frame shown in FIG. 9, automatic density setting (AUTO) is displayed as an example, wherein three options are displayed, i.e., the automatic density setup for normal originals (character images and text) only, the automatic density setup for text and photographic images, and the automatic density setup for photographic images only. Of these, the setting for copying normal originals only is selected (with black and white reversed).

Figure 10:
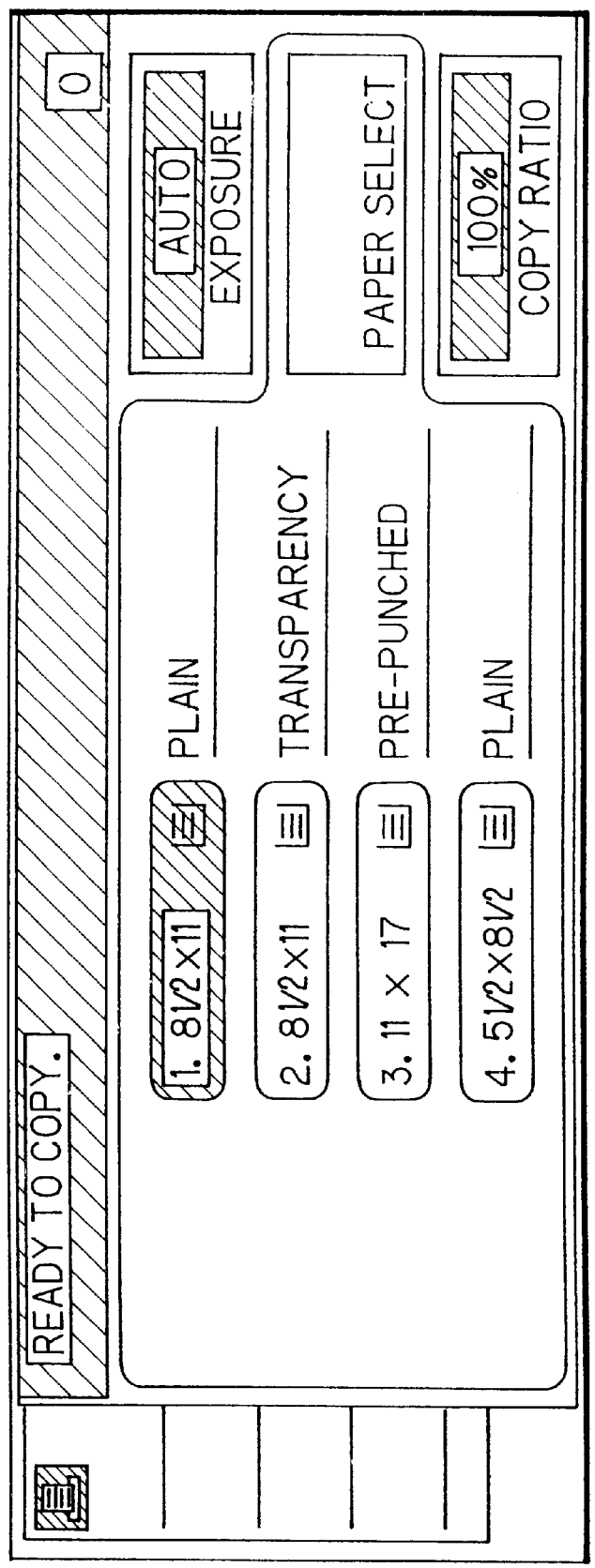
FIG. 10 is an illustrative view of a display frame example of the display portion, showing the copy paper setup frame.

When copy paper key 801*b* (FIG. 4) in basic frame 801 is pressed (operated), the display changes from the basic frame to the paper setup frame as shown in FIG. 10. Four options, i.e., four types of paper are shown in the paper setup frame shown in FIG. 10. Of these, 8½×11 (letter size) paper is selected (with black and white reversed).

Figure 11:
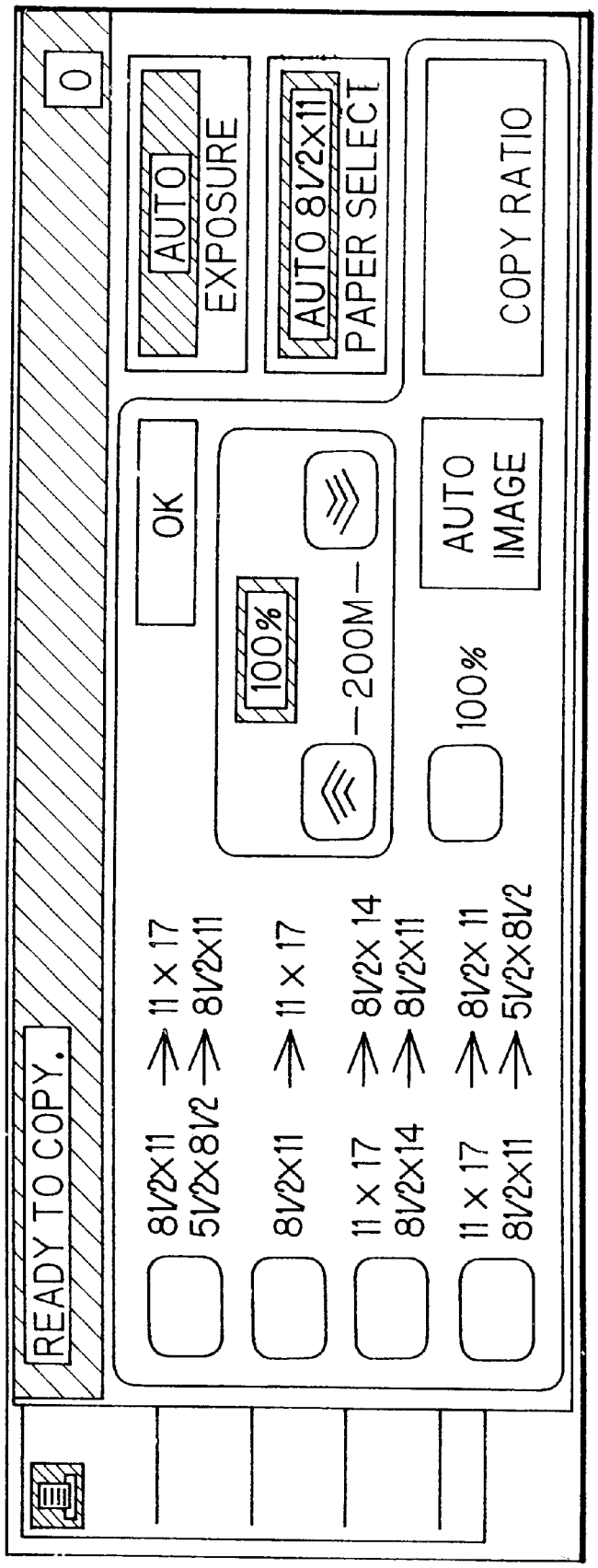
FIG. 11 is an illustrative view of a display frame example of the display portion, showing copy magnification setup frame.

When copy magnification selecting key 801*c* (FIG. 4) in basic frame 801 is pressed (operated), the display changes from the basic frame to the magnification setup frame as shown in FIG. 11. In the magnification setup frame shown in FIG. 11, ×1 (100%) copy is selected (with black and white reversed).

The above setup frames are all as to the copier function, but the contents of the setup frames as to the print function or as to the fax function are similar to those of the above frames.

Displayed in job status frame 802 shown in FIG. 6, a main status area 802*a* for displaying jobs in the order in which they are to be done, the job list area(processing job list area) 802*b*, an aftermentioned job mode key 802*c*, etc. When job reservations are determined by the input through the control portion, the details of the jobs are displayed in main status area 802*a* as shown in FIG. 8 while icons, for example, representing the contents of the jobs are displayed in job list area 802*b* (see FIGS. 7 and 8).

The display in main status area 802*a* is not particularly limited. In this case, as shown in FIGS. 6 and 8, job information is displayed from the top to the bottom. Examples of the information as to a job displayed in job status frame 802 include user name/mode name, set time, number of sets, current status, and the like, which are almost the same as those in conventional display systems.

Because of the limitation of the display area in the display portion, the number of jobs able to be displayed at a time within main status area 802*a* is limited. For example, in FIG. 6, four jobs can be displayed. But this will not limit the embodiment. Displayed on the right side of main status area 802*a* are up and down arrow keys 802*d*, with which information of the jobs with either higher or lower priorities, not displayed in main status area 802*a* can be displayed.

Figure 7:
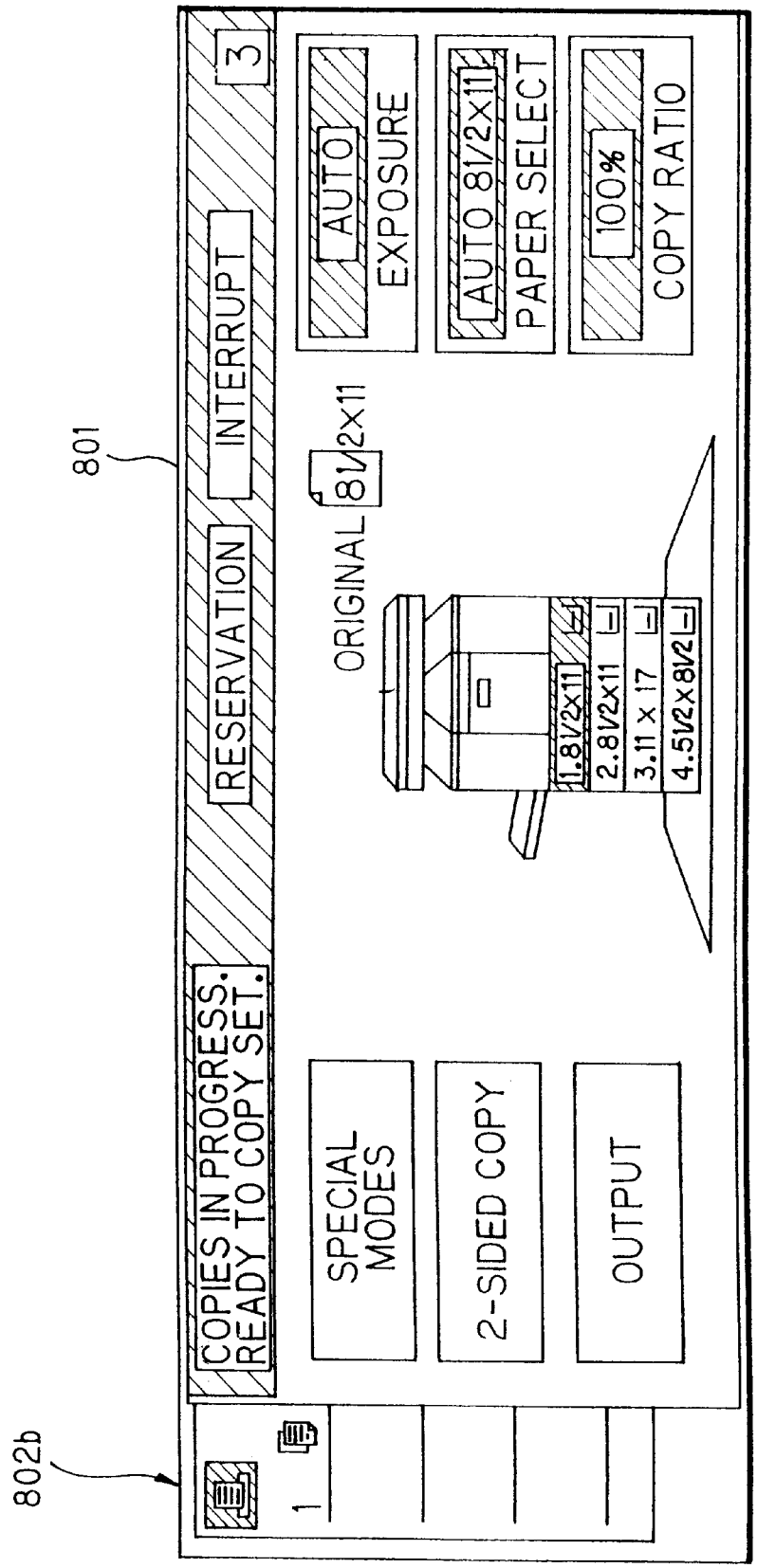
FIG. 7 is an illustrative view of a display frame example of the display portion, showing the copy job register frame.
Figure 8:
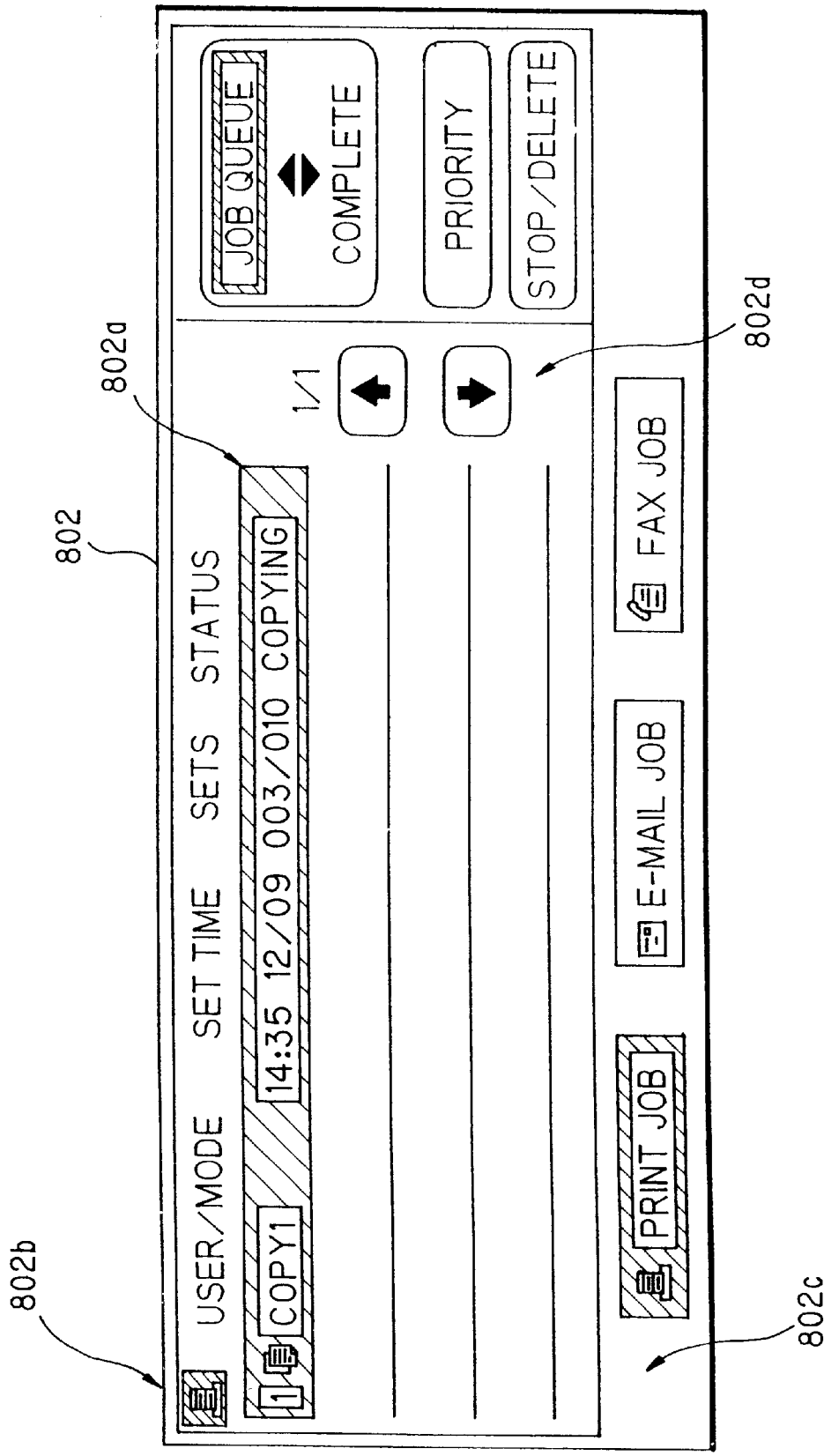
FIG. 8 is an illustrative view of a display frame example of the display portion, showing the copy job register frame.

The job list area 802*b* is preferably included as part of job status frame 802 (FIG. 8), and job list area 802*b* only is adapted to remain displayed as is as the background of basic frame 801 when the aforementioned basic frame 801 is displayed so as to overlie on job status frame 802 (FIG. 7). In other words, job list area 802*b* as part of job status frame 802 will not be hidden by the laying over of basic frame 801 but is displayed continuously with basic frame 801. Conversely, the part of the job status frame other than job list area 802*b* is hidden by basic frame 801 (FIG. 7).

In this way, in the information display system of the present invention, when basic frame 801 is displayed as shown in FIG. 7, job list area 802*b* summarizing the contents of job status frame 802 are also displayed. Therefore, even when basic frame 801 is displayed for allowing for operator's new input to the image forming apparatus, it is possible for the operator to review the processing job contents having been input, from job list area 802*b*. By this configuration, the operator is able to make new input, always recognizing the current status of the image forming apparatus.

It is preferred that the above job list area 802*b* is included as part of job status frame 802 and basic frame 801 is displayed so as to overlay job status frame 802 while leaving job list area 802*b* as is as the background. However, the present invention should not be limited to this. For example, if the full frame of the display has to be totally changed over, basic frame 801 to be displayed anew may contain job list area 802*b* as part thereof.

Alternatively, job list area 802*b* may be removable as necessary. For example, there are cases where display of job status frame 802 may be meaningless in the situation where the apparatus is set ready without any execution or reservation of image forming and other jobs. In such a case, job list area 802*b* may disappear automatically or in response to the instruction input through the control portion.

On the contrary, there are cases where there are good enough reasons to display job list area 802*b* even if there is no job being currently effected or reserved. For example, when the status of no job being effected or reserved needs to be confirmed, and when information should be transmitted in real time via the network or telephone line are such cases. To deal with such a case, it is preferred if the job list area can be re-displayed by giving the instruction through the control portion.

Although the above job list area 802*b* is not particularly limited as long as the processing job contents can be displayed in a simple and clear manner, it is preferred if icons representing job contents in the image forming apparatus are displayed as stated above(see FIGS. 7 and 8). This facilitates easy and reliable recognition of the processing job contents.

Figure 12:
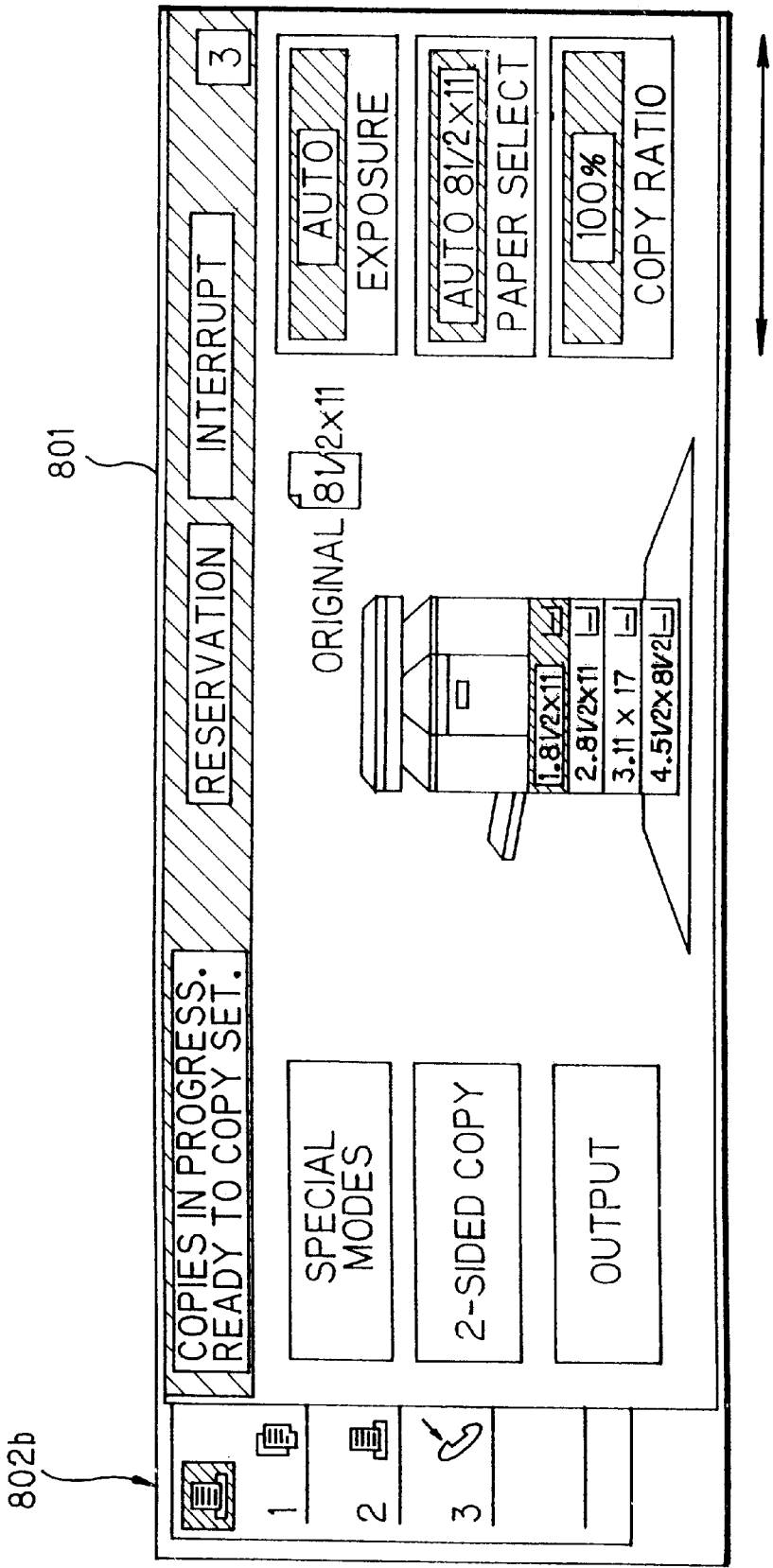
FIG. 12 is an illustrative view of a display frame example of the display portion, showing the print basic frame.
Figure 13:
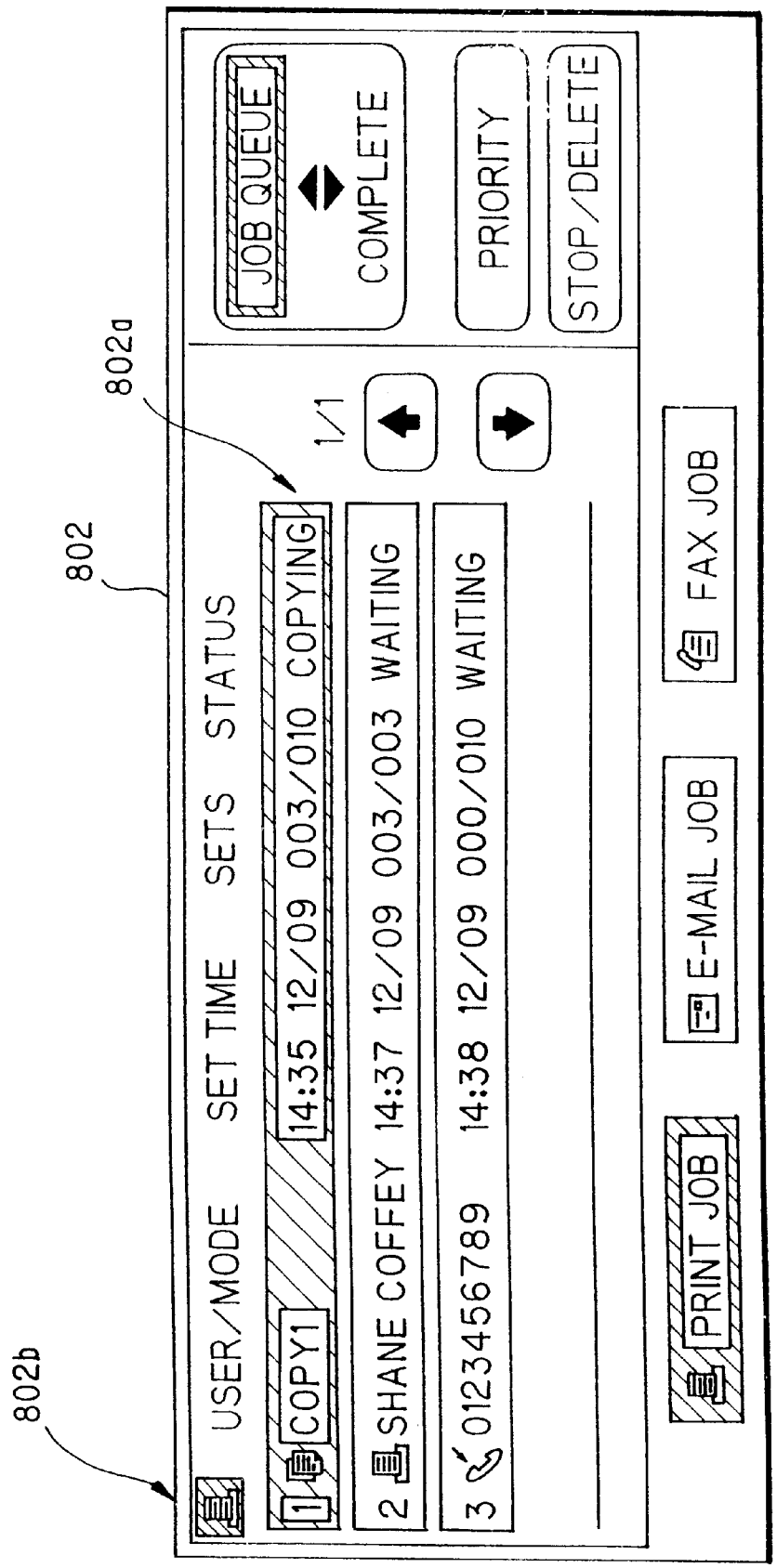
FIG. 13 is an illustrative view of a display frame example of the display portion, showing the print status frame.

In main status area 802*a* of job status frame 802, job details are displayed from the top, as shown in FIGS. 12 and 13, in the order in which the jobs are to be done. It is preferred that job list area 802*b* is also displayed correspondingly to this main status area 802*a*. In this embodiment, job list area 802*b* is arranged on the left end side of main status area 802*a* while basic frame 801 can be pulled in and out with respect to the right side of the display, so that job list area 802*b* on the left end side continues to be displayed without any change.

Accordingly, it is preferred that the icons in job list area 802*b* are displayed in the order in which the associated jobs are to be done. By this configuration, if main status area 802*a* is hidden by basic frame 801, the processing order of the jobs can be known and visually clearly apparent, as shown in FIG. 12. That is, grasp of the processing order becomes easy when job interruption, which will be described later, needs to be made.

As a feature of the icons, as soon as a new job instruction is input and the job reservation is confirmed with instruction input frame (basic frame) 801 displayed, the icon representing the new job is adapted to be added to job list area 802*b* in the due position. Therefore, the operator is able to confirm the input result in real time while grasping the current status of the image forming apparatus.

Figure 20:
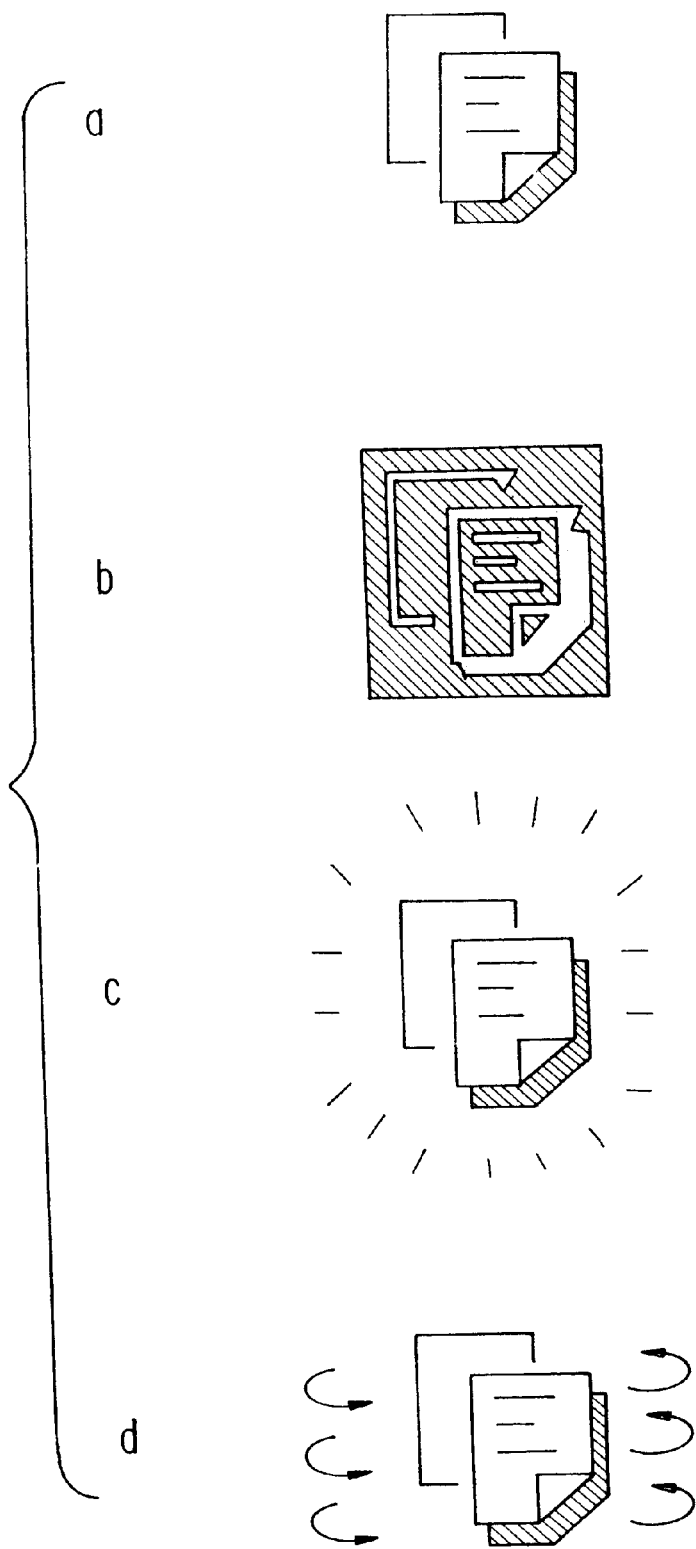
FIG. 20 is an illustrative view showing display examples of icons dependent on job states.

It is preferred that the icon is adapted to represent the job state, i.e., so as to let the operator know whether a job is undergoing or before execution and that a job is that which has been just added and reserved. For example, as shown in FIG. 20, in the case of a job of copy operation, suppose that the basic state, i.e., before execution of the copy job, is represented by an icon 'a'. This copy job being executed is represented by an icon 'b' which is the same icon as the basic state but with black and white reversed. The copy job immediately after its addition and reservation has been confirmed may be presented by flashing the basic icon as shown by 'c' or by the rotation of the basic icon as shown by 'd'.

With these display settings, each state can be easily distinguished. In particular, use of an icon with black and white reversed and use of an icon flashing or turning may provide easy distinction between states without changing the shape of the icon. Resultantly, it is possible for the user to further easily and positively confirm the processing job states.

Figure 22:
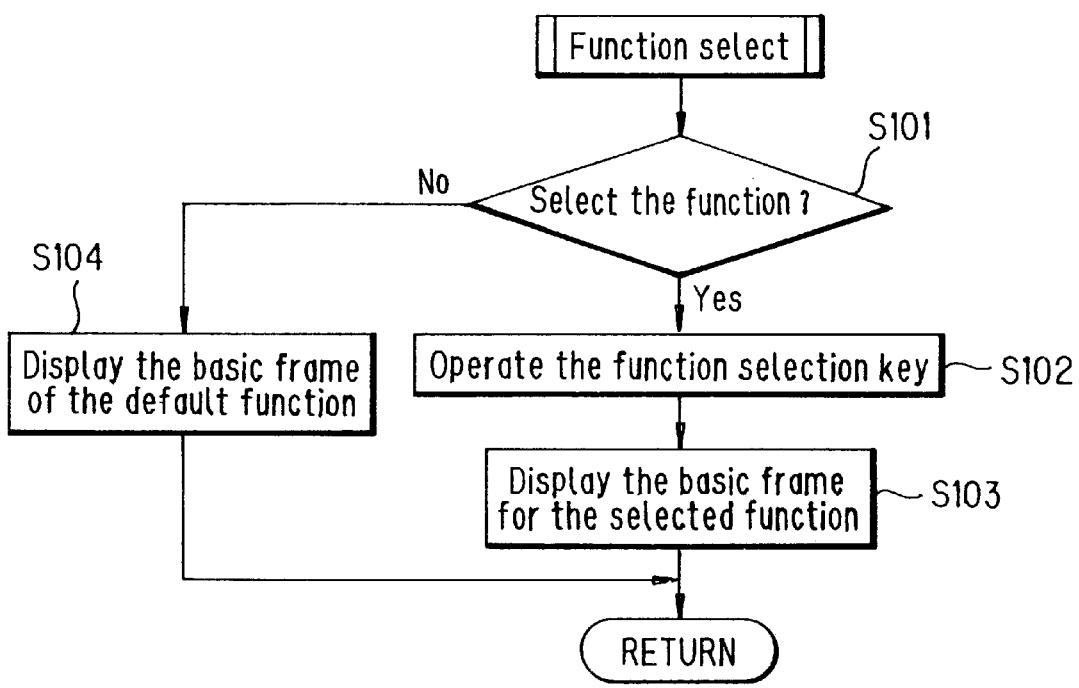
FIG. 22 is a flowchart showing the processing sequence of function selection.
Figure 23:
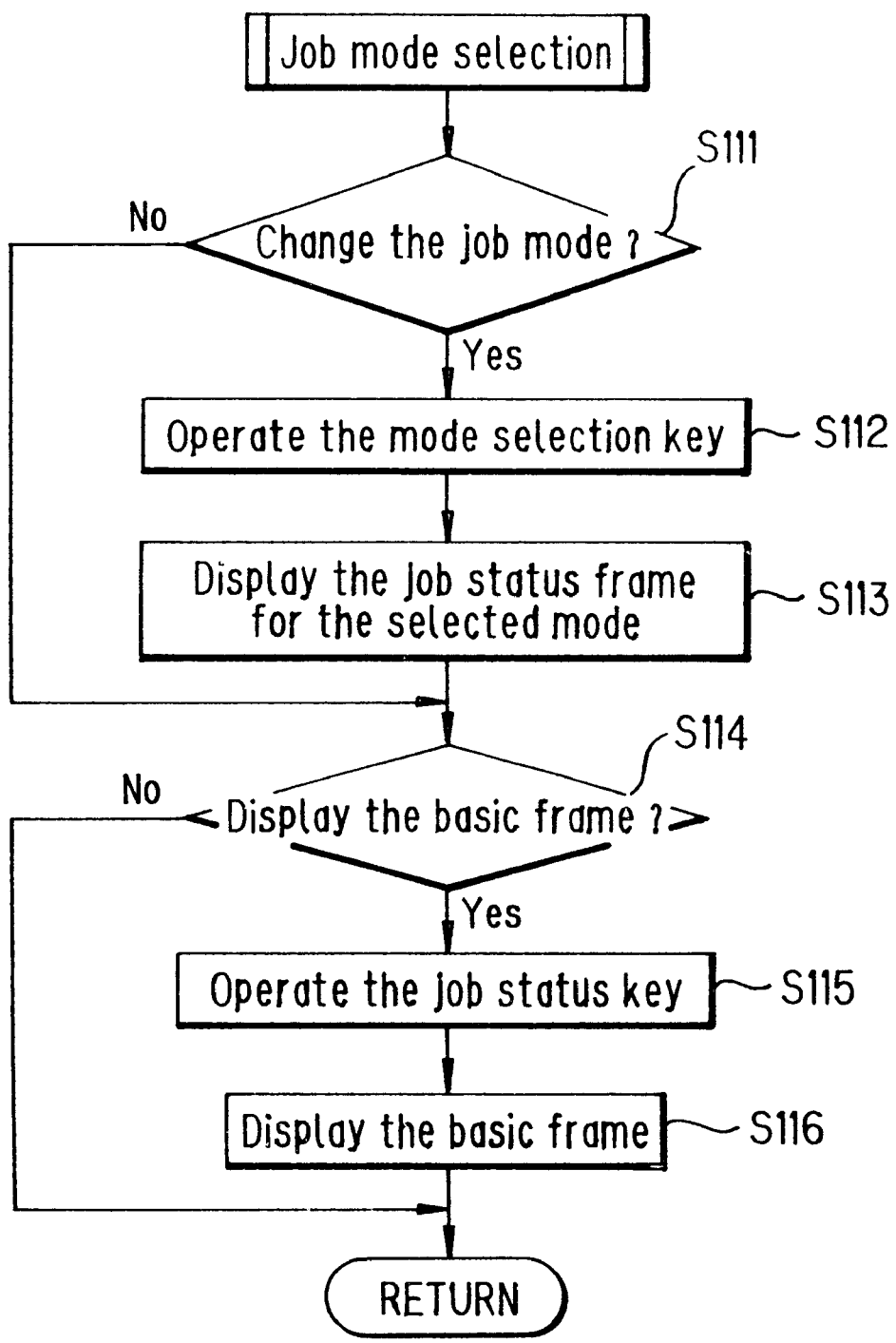
FIG. 23 is a flowchart showing the processing sequence of job mode selection.

Next, instruction input in the information display system of the present invention, execution and display of jobs accompanying therewith will be described in detail with reference to the flowcharts shown in FIGS. 21 to 23.

First, after the image forming apparatus has been activated, as Step S1, the function of the image forming apparatus is selected.

In this example, the copier function is selected and basic frame 801 for the copier function is displayed as shown in FIGS. 4 and 5. At Step S1 directly after activation of image forming apparatus, the apparatus has no instructions input or is in the state of waiting for instruction input. Therefore, as shown in FIGS. 4 and 5, the display portion displays basic frame 801 with no icon displayed in job list area 802b in the job status frame which is being displayed as the background of basic frame 801.

Next, the function selection at Step S1 will be described with reference to the flowchart shown in FIG. 22. First, at Step S101, it is judged as to whether the function is changed. Since the image forming apparatus of this embodiment incorporates the copier function, the printer function, the fax function and the internet-fax function, one of these should be selected. It is preferred that the function which is most frequently used should be automatically selected at the time of activation of the image forming apparatus. For example, since the copier function is automatically selected at the time of activation in this embodiment, whether the function is changed from the copier function is determined at this step S101.

When the function is changed at Step S101 (when the judgement at Step S101 is affirmative), the function selecting key in the control portion is operated at Step S102. At Step S103, the basic frame for the selected function is displayed in the display portion. On the other hand, when no change of the function is made at Step S101, basic frame 801 for the default function is displayed at Step S104.

The above basic frame 801 is displayed preferentially when the image forming apparatus is out of operation or during the waiting state. This frame is preferably adapted to be automatically displayed in response to input of a new instruction even when the image forming apparatus is in operation. This will be described later.

The above basic frame 801 is displayed so as to be laid over job status frame 802, and can be removed at any time by the operation through the control portion. For example, when job status key 706 shown in FIG. 4 is pressed while basic frame 801 is being displayed as shown in FIGS. 4 and 5, basic frame 801 disappears so that the full content of job status frame 802 is displayed as shown in FIG. 6. Here the way of disappearance of basic frame 801 is not particularly limited. In this embodiment, basic frame 801 disappears as if it were pulled into the right edge of the display portion. When job status key 706 is pressed once again, basic frame 801 appears again as if it were pulled out from the right edge of the display portion.

The reason why basic frame 801 is pulled in and out is to display job status frame 802 at a basically fixed position. That is, by deleting basic frame 801 as it is pulled in and displaying it again as it is pulled out, the display position and the display of job list area 802b can be all but unchanged without the need of changing the display of job status frame 802. Therefore, even if basic frame 801 appears overlaid on job status frame 802, the user can readily understand the fact that the image forming apparatus has received an instruction of a new processing job.

Figure 21:
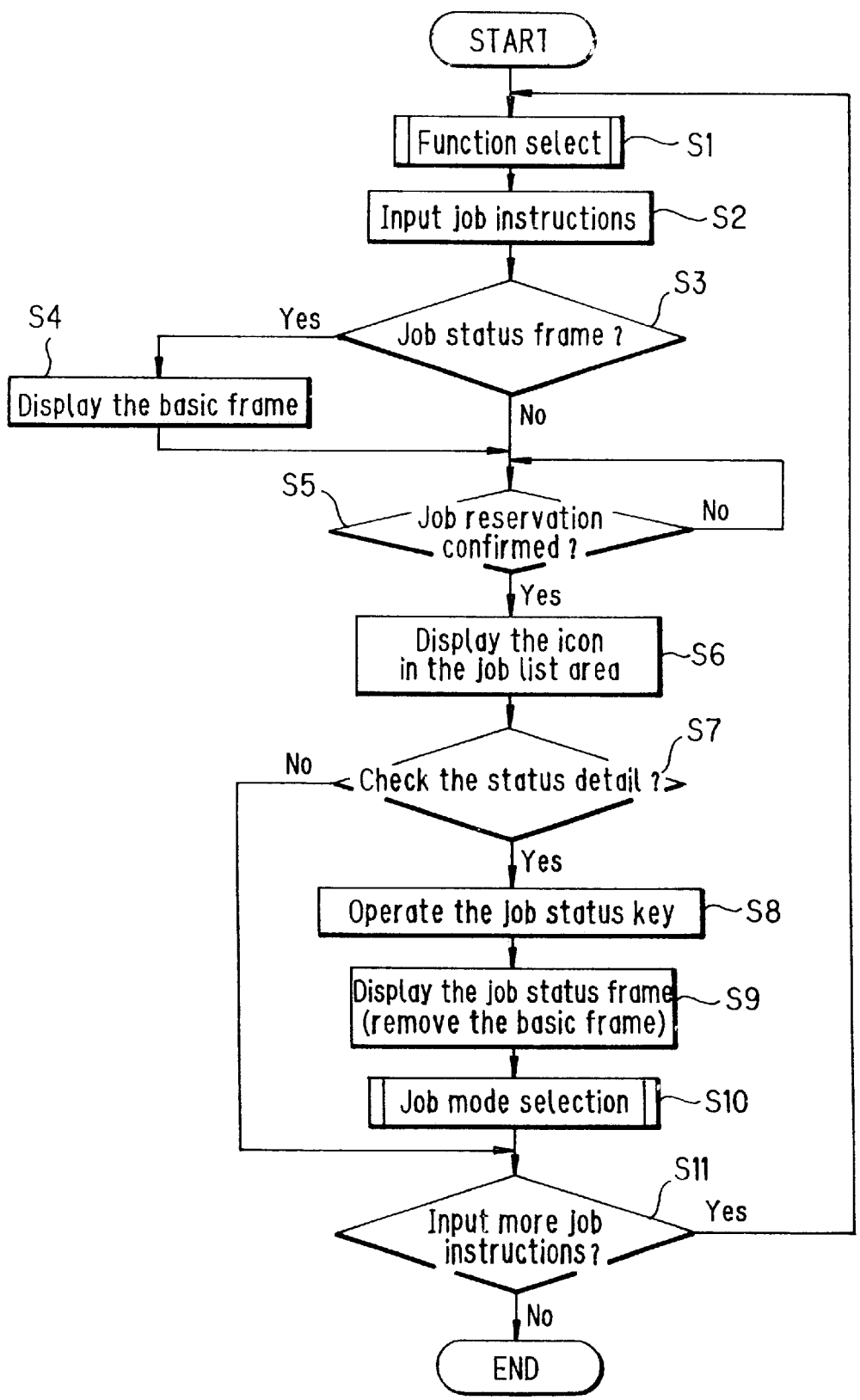
FIG. 21 is a flowchart showing in detail the processing sequence involving input of instructions in the information display system of the present invention, execution and display f the jobs designated by the instructions.

Turning back to the flowchart shown in FIG. 21, the next job instructions are given at Step S2. Since the copier function is selected in this embodiment, the copy density, the paper, the magnification ratio, etc., are set through the above-described setup frames (FIGS. 9 to 11) and the number of copies is given through ten key pad 701 (see FIG. 4) of the control portion. For example, when the number of copies is set at 3, the input number of copies is displayed in the upper right position, for example, of basic frame 801, as shown in FIG. 7. At Step S3, the controller judges whether job status frame 802 is displayed on the display portion. If job status frame 802 is displayed, the controller automatically changes the display into basic frame 801 in response to input of instructions at Step S4. If basic frame 801 is displayed in the display portion at Step S3, the operation goes directly to Step S5.

Since basic frame 801 is the instruction input frame allowing for input of instructions, this frame is adapted to appear necessarily when a new instruction input to the image forming apparatus is given. Therefore, when a command of effecting a copying operation, for example, is given while job status frame 802 is being displayed, basic frame 801 appears automatically as stated above without any operation of job status key 706 for displaying basic frame 801. This configuration makes input of instructions reliable.

While instructions of a copying job are being given, the controller is checking whether reservation of the job being input has been completed at Step S5. When the reservation is confirmed, the icon representing the content of the job is displayed, as shown in FIG. 7, in job list area 802b at Step S6. In FIG. 7, an icon representing a copying operation is displayed.

Next, at Step S7, it is checked whether the user will review the details of the job status. When the result of the judgement indicates that the detail will be reviewed, the operation goes to Step S8. When the user presses (operates) job status key 706 in the control portion, basic frame 801 disappears as stated above as it being pulled into the right side of the display portion at Step S9 and the full content of job status frame 802 appears from the underneath as shown in FIG. 8. When the result of the judgement at Step S7 indicates that the details will not be reviewed, the operation goes to Step S11.

Next, at Step S10, in job status frame 802, the user determines whether the job mode should be changed from that currently displayed, the copy mode, in this case, to another mode. If no change is made, the operation directly goes to Step S11.

Here, the job mode selection at Step S10 will be explained with reference to the flowchart shown in FIG. 23.

First, at Step S111, the system asks the operator if the job mode should be changed. Here, job modes indicate multiple processing modes incorporated in the image forming apparatus. In this embodiment, the transmission mode for transmitting information contains the fax job mode and the e-mail job mode while the output mode for outputting information contains the print job mode. Since the copy job is included in the print job mode, all and only the jobs of image forming are listed and displayed in the job status frame 802 in this case, as shown in FIG. 8.

When the user determines that job needs to be changed at Step S111, one of mode selection keys 802c being displayed at the bottom of job status frame 802 shown in FIG. 8 should be operated at Step S112 so as to select the desired job mode. Since the print job mode has been initially selected, the 'PRINT JOB' key is highlighted (with black and white reversed in the figure). If, for example, the fax job mode is selected, the 'FAX JOB' key is highlighted at Step S113, as shown in FIG. 19 and the jobs listed for waiting for fax transmission are displayed in job status frame 802.

Figure 18:
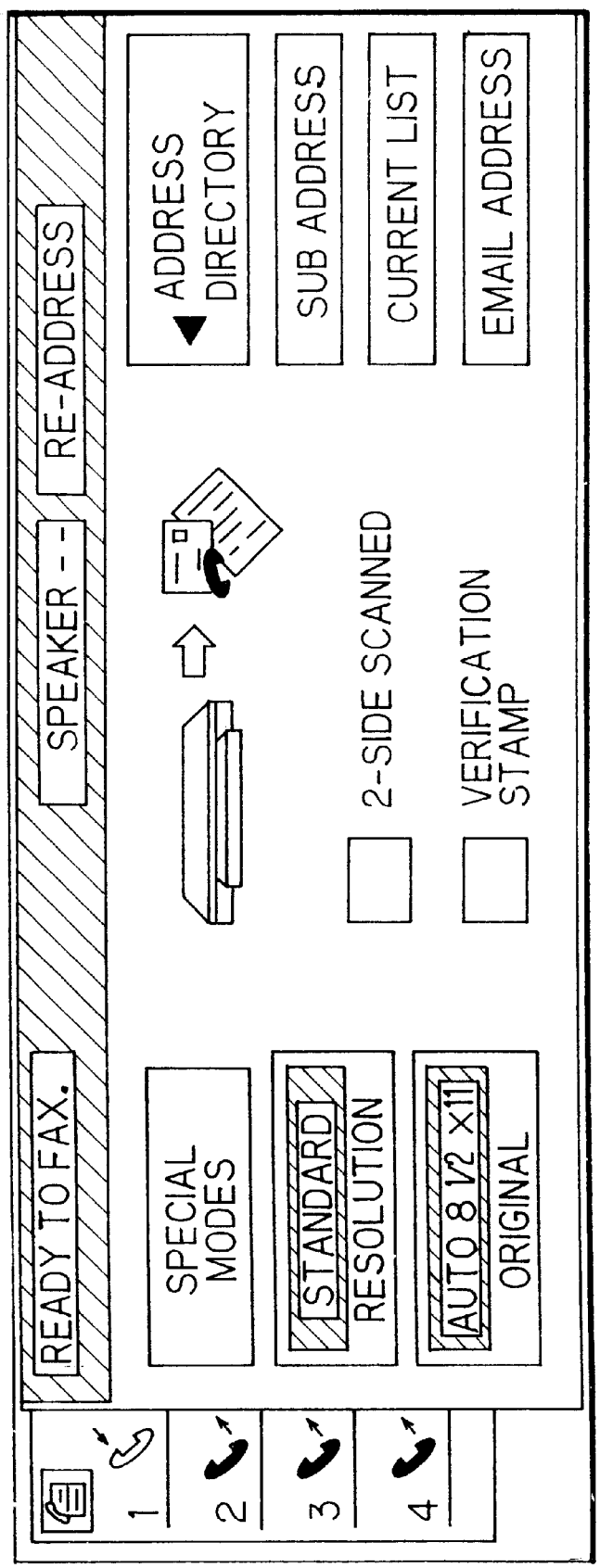
FIG. 18 is an illustrative view of a display frame example of the display portion, showing the basic fax frame.

At Step S114, the user determines whether basic frame 801 should be displayed. If job status frame 802 is displayed as is, Step S10 is ended. If basic frame 801 is displayed, the operation goes to Step S115 where job status key 706 is operated so as to display basic frame 801 shown in FIG. 18, at Step S116. Needless to say, in this case, job list area 802b remains displayed as is as the background of basic frame 801.

In the above way, when there are multiple job modes, the reservation status is preferably displayed for each processing mode. By this manipulation, the status of the image forming apparatus as to the mode in which instruction is going to be given is displayed, so that the operator is able to give new instructions to the apparatus whilst confirming the status of the image forming apparatus.

As has been described heretofore, in the information display system according to the present invention, depending upon the user's desire, it is possible to cancel basic frame 801 by operating job status key 706 and preferentially display job status frame 802 even while a job is being executed in the image forming apparatus. Therefore, the operator is allowed not only to roughly know job contents from their icons but also confirm the details from job status frame 802.

Conversely, even when job status frame 802 is displayed to check the job detail with basic frame 801 temporarily deleted, the original basic frame 801 can be displayed again as appropriate if required, for example, when instructions of a new job need be given. In this case, job list area 802b is also displayed along with basic frame 801. As a result the operator, after having confirmed the details of the jobs already set up, is able to give instructions of a new job whilst recognizing the rough status of the jobs.

Turning back to the flowchart shown in FIG. 21, at Step S11, the user determines whether further instructions of a job should be input. If there is no more input, the operation sequence is ended. If further instructions need be input, the operation goes to Step S1.

When a multiple number of jobs have been reserved by the above operation sequence, the display portion displays the frames shown in FIGS. 12 to 15. In this case, a job of copier function was reserved first, a job of printer function was reserved second and a job of forming a facsimile received through fax communication was reserved last. As shown in FIG. 12, in the state where basic frame 801 is displayed, the icon for a copy job is displayed in the first place of job list area 802b, the icon for a print job is displayed in the second place and the icon for facsimile image forming is displayed in the third place while basic frame 801 for the copy job that is currently effected is displayed.

In this state, when job status key 706 is operated, basic frame 801 disappears and job status frame 802 is displayed. In job status frame 802, the job currently being executed is displayed with black and white reversed, for example (FIG. 13).

Figure 14:
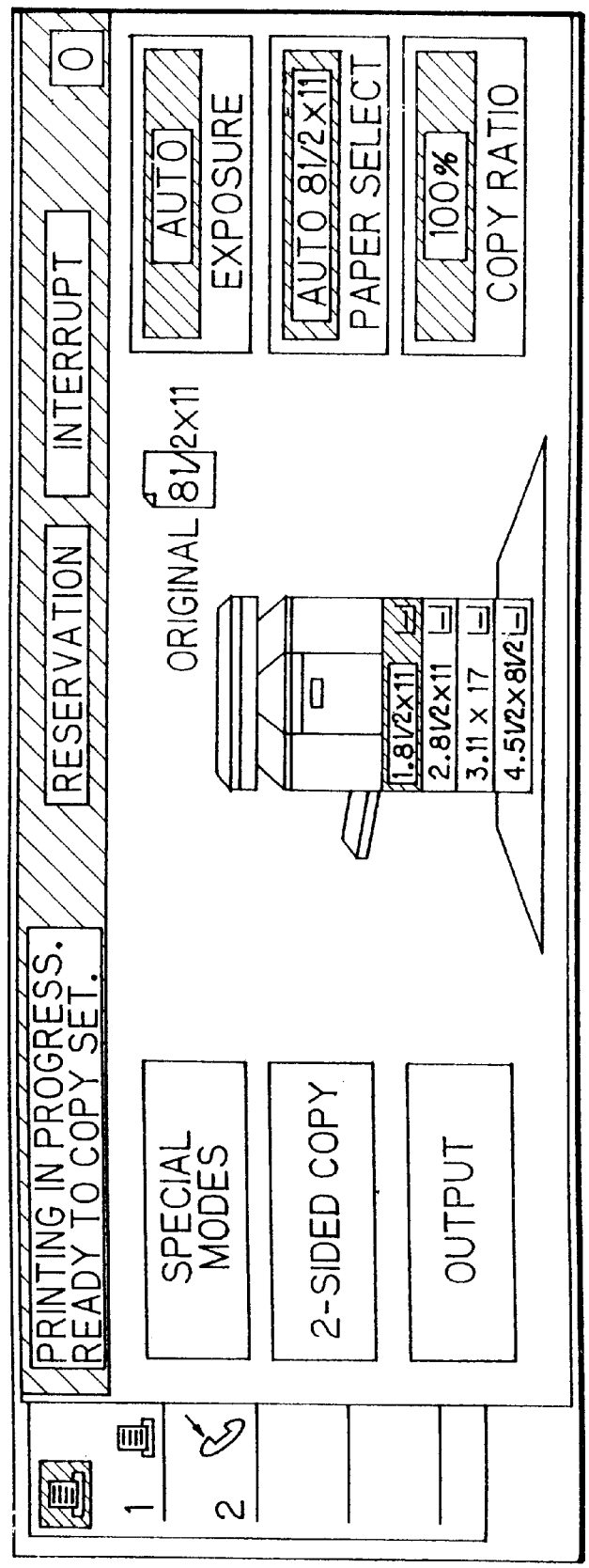
FIG. 14 is an illustrative view of a display frame example of the display portion, showing the basic print frame.
Figure 15:
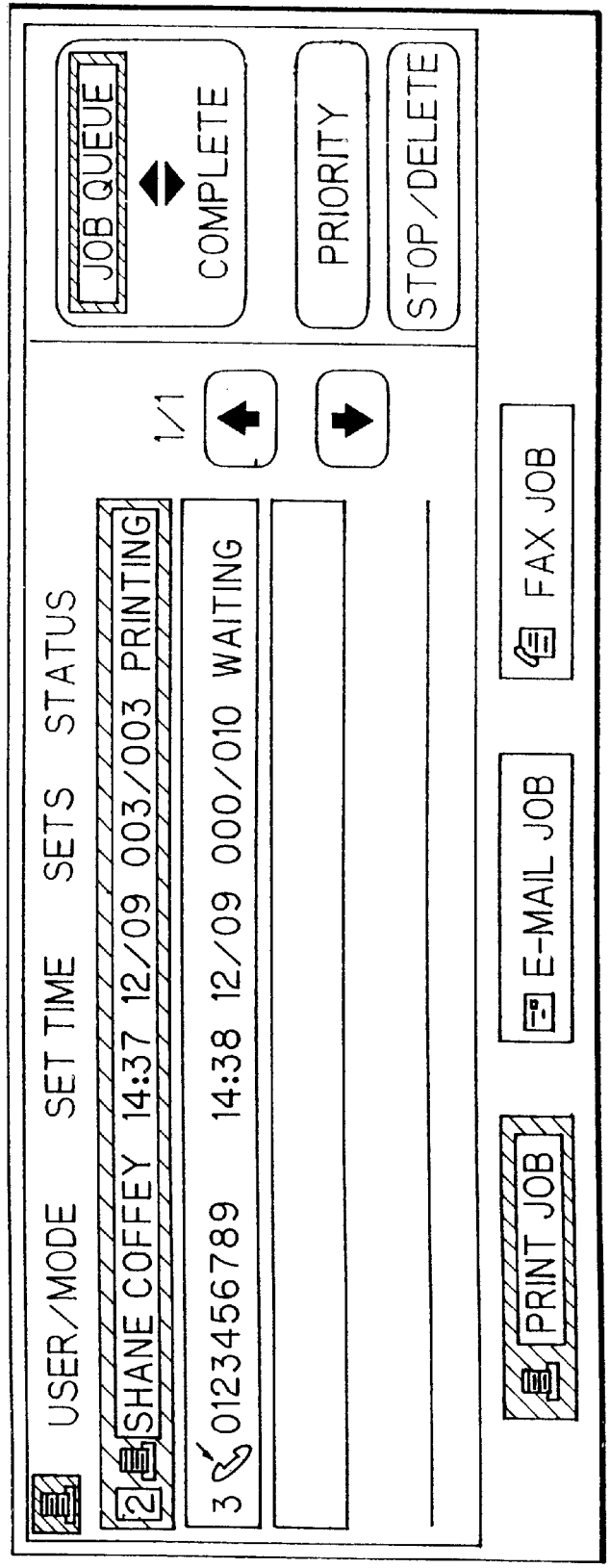
FIG. 15 is an illustrative view of a display frame example of the display portion, showing the print status frame.

When the copy job in the first place is complete, as shown in FIGS. 14 and 15, the job information and icon in the first place is deleted from job status frame 802 including job list area 802b, and the print job which had been displayed in the second place up to now is displayed in the first place, the facsimile image forming job displayed in the third place is displayed in the second place. Thereafter, when the print job is started, the information and icon of the print job is highlighted with black and white being reversed.

In this embodiment, job interrupt entry can be made. For example, with the state shown in FIG. 12, when the 'INTERRUPT' key located at the top in the basic frame 801 is operated, a now job can be inserted into the first place in the reservation queue.

Figure 16:
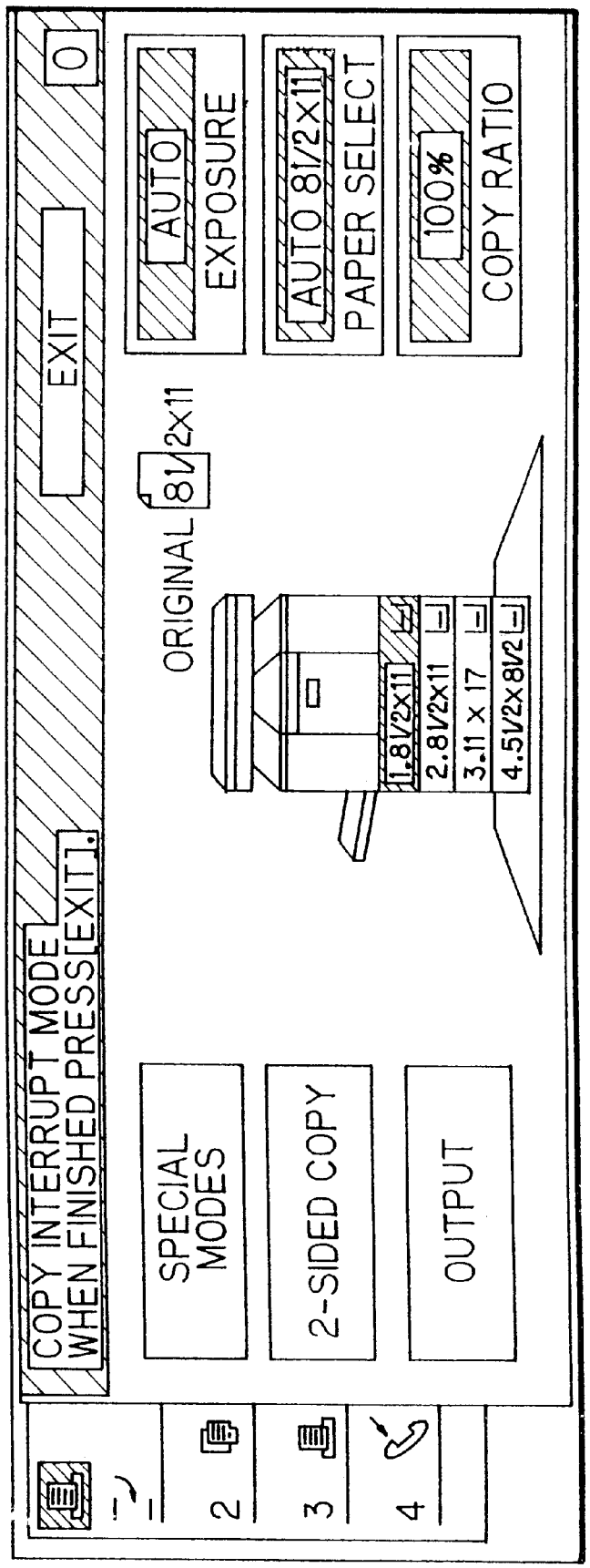
FIG. 16 is an illustrative view of a display frame example of the display portion, showing the basic frame in interrupt mode.
Figure 17:
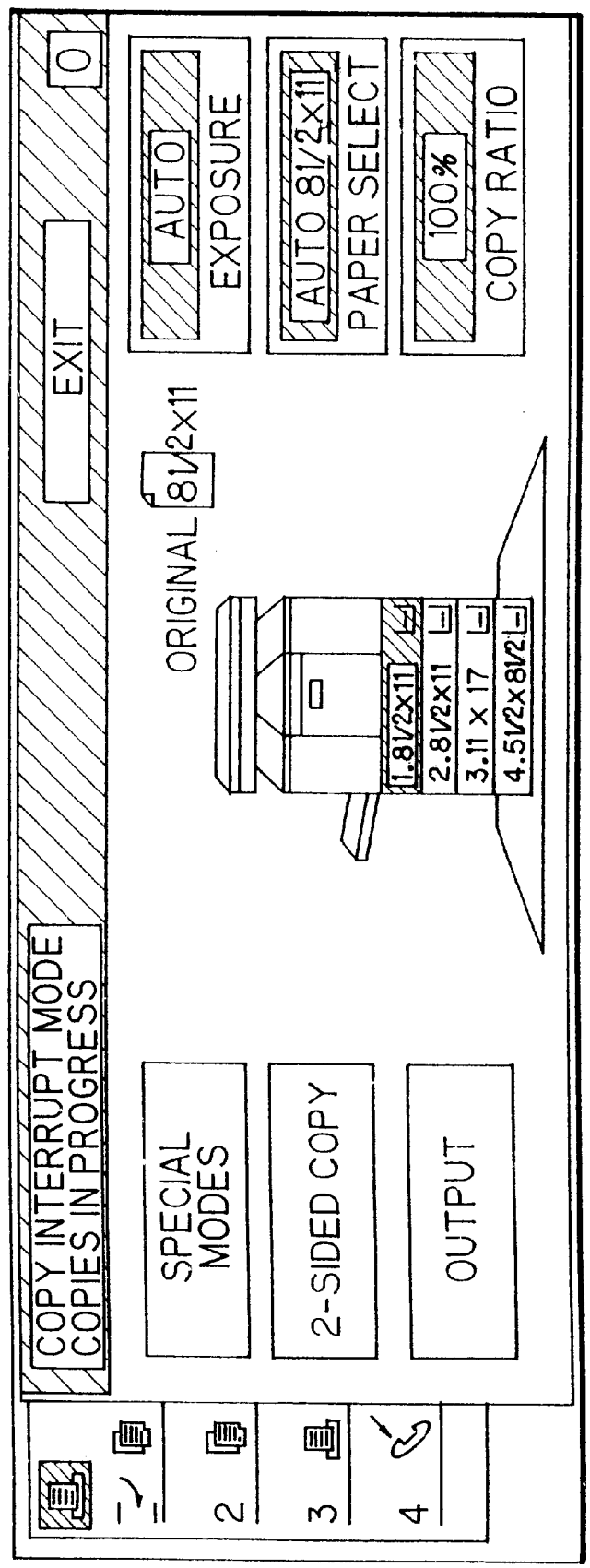
FIG. 17 is an illustrative view of a display frame example of the display portion, showing the job register frame in interrupt mode.

In this case, an icon representing the interruption is displayed in job list area 802b as shown in FIG. 16 and the copy job which had been displayed in the first place up to now is shifted to the second place, the other two jobs also being shifted by one rank. That is, when entry of interruption is complete, the new copy icon is displayed in the first place, the copy job, print job and facsimile image forming job, which had been displayed in the first, second and third places, respectively, are displayed in the second, third and fourth places, as shown in FIG. 17.

According to the present invention, even with the subsequent frame displayed, a summary display area that presents the summary of the information displayed in the preceding frame is displayed along with the subsequent frame. Therefore, even with the subsequent frame displayed, it is possible to grasp the content of the preceding frame which is hidden by the subsequent frame. Thus, it is possible to easily grasp the total status of image information being displayed.

According to the present invention, when the subsequent frame is displayed and overlaid on the preceding frame, the summary display area of the preceding frame is kept as the background as it is. Therefore, even with the subsequent frame displayed, it is possible to grasp the content of the preceding frame which is hidden by the subsequent frame. Thus, even when multiple images are displayed laid one over another, it is possible to easily grasp the total status of images being displayed.

According to the present invention, since the summary display area is enabled to disappear and can be displayed again, it is possible to remove the summary display area when display of the summary display area is meaningless. Conversely, the summary display area can be displayed again when the information in the preceding frame need be examined.

According to the present invention, with the instruction input frame displayed, the processing job summary area that briefly presents the content of the processing job being displayed in the status confirmation frame can be displayed at the same time. Therefore, the contents of the processing jobs having been, input already can be reviewed by the processing job summary area even when the instruction input frame is displayed to allow new instructions to be input. As a result, it is possible to confirm the current status of the information processing apparatus at any time while new input can be given whilst confirming the status of the information processing apparatus.

According to the present invention, the status, confirmation frame includes as part thereof the processing job summary area as a processing job list area while the instruction input frame is displayed so as to be overlaid on the status confirmation frame with the processing job list area kept as the background as it is. Therefore, the contents of the processing jobs having been input already can be reviewed by the processing job list area in the status confirmation frame even when the instruction input frame is displayed to allow new instructions to be input. As a result, it is possible to confirm the current status of the information processing apparatus at any time while new input can be given whilst confirming the status of the information processing apparatus.

According to the present invention, since the processing job summary area is displayed as part of the instruction input frame, the summary of the display of the status confirmation frame can be reviewed.

There are cases where display of the processing job display area along with the status confirmation frame is meaningless when, for example, no processing job reservation is made. Accordingly, in the present invention, the summary display area can be removed. On the contrary, there are cases where the operator needs to confirm that there is no processing job reservation while engaged in the status confirmation frame. In such a case, the processing job display area can be displayed again.

According to the present invention, since icons representing the contents of processing jobs are displayed in the processing job list area, this makes it possible for the operator to confirm the contents of processing more easily and exactly.

According to the present invention, since icons representing processing jobs are displayed in the order in which the processing jobs are to be executed, the operator, having confirmed the status of the information processing apparatus, is able to give instructions of a new processing job and confirm the reception of the new instructions (the order of processing) at the same time.

According to the present invention, when instructions of a new processing job are input through the instruction input frame and the processing job is confirmed, an icon representing the new processing job is additionally displayed in the processing job list area. Therefore, the operator, having confirmed the status of the information processing apparatus, is able to give instructions of a new processing job and confirm that the information processing apparatus has accepted the instructions of the new processing job, at the same time.

According to the present invention, since icons displayed in the processing job list area are displayed in such a manner that the user can know whether a job is being executed or before execution and that a job is that which has been just additionally reserved, the user is able to recognize the current operation status of the information processing apparatus more easily and exactly by merely looking at the processing job list area.

According to the present invention, it is possible to display the states of a processing job distinctively, between that before execution, during execution and that where the job has been just additionally reserved, without changing the icon shape, so that the user is able to recognize the status of a processing job more easily and exactly.

According to the present invention, the instruction input frame can be made to disappear and can be displayed again even during execution of any processing job. Thus, depending upon the user's desire, it is possible to cancel the instruction input frame and preferentially display the status confirmation frame even while a job is being executed in the image processing apparatus. Therefore, the operator is allowed not only to roughly know the contents of processing jobs from their icons but also confirm the details from the status confirmation frame, as necessary. Conversely, even when status confirmation frame is displayed to check the processing job detail with the instruction input frame temporarily deleted, the original instruction input frame can be displayed again as appropriate if required when instructions of a new job need be given or in other cases. As a result, the operator, after having confirmed the details of the contents of processing jobs already set up, is able to give instructions of a new job whilst recognizing the status of the processing jobs in progress.

According to the present invention, since the instruction input frame is displayed laid over the status confirmation frame which is basically displayed at a fixed position, the operator is able to input instructions of a new processing job whilst recognizing the presence of the processing jobs already set up. Further, since the display position is fixed, the user is able to readily know that the information processing apparatus has receives user's instructions of a new processing job.

According to the present invention, the instruction input frame is displayed necessarily when instructions of a new processing job are input. Therefore, when, for example, instructions of performing a copying operation is given with the status confirmation frame displayed, the instruction input frame is automatically displayed without giving any input indicating display of the instruction input frame. As a result, it is possible to positively confirm the instructions newly input to the information processing apparatus even with the instruction input frame undisplayed.

According to the present invention, in the case where there are multiple processing modes, the status confirmation frame displays the status of processing jobs for each processing mode. In the case where the multiple processing modes include the transmission mode for transmitting information and the output mode for outputting information, the reservation status of processing jobs as to information transmission is displayed in the processing job list area of the status confirmation frame when instructions of processing jobs as to the transmission mode are given through the instruction input frame. Further, the transmission mode for transmitting information includes the facsimile mode for transmitting information via general telephone lines and the e-mail mode for transmitting information by way of internet e-mail. Therefore, when the information processing apparatus incorporates multiple processing modes, the status confirmation frame will display the status of processing jobs for each processing mode. For example, when the multiple processing modes include the transmission mode for transmitting information and the output mode for outputting information and further the transmission mode has two modes, i.e., the facsimile mode and the e-mail mode, the reservation status of processing jobs are displayed for each of the modes. In the above way, the status of the information processing apparatus as to the mode in which instruction is going to be given is displayed, so that the operator is able to give new instructions to the apparatus whilst confirming the status of the information processing apparatus.

According to the present invention, an image forming apparatus includes the information display system of the invention, and further has the function of being connected to networks. Moreover, the apparatus has at least two functions of copier, facsimile and printer functions and these functions can be changed one from another. Still more, the image forming apparatus has the internet facsimile function for enabling transmission and reception of information by way of e-mail. Therefore, the image forming apparatus of the present invention allows the operator to grasp the current status of the image forming apparatus even if instructions of multiple image forming jobs are input and allows the operator to confirm each of the image forming jobs. Thus, this configuration makes it possible to enable more exact designation of image forming.

What is claimed is:

1. An information display system capable of displaying multiple frames, characterized in that when a subsequent frame is overlaid on a previous frame, a summary display area that presents a summary of the information displayed in the preceding frame is displayed along with the subsequent frame, wherein the summary display area presents at least one icon for briefly displaying the information displayed in the preceding frame and hidden by the subsequent frame.

2. The information display system according to claim 1, wherein the preceding frame has as part thereof the summary display area that presents the summary of the information displayed in the frame thereof and when the subsequent frame is displayed, the subsequent frame is overlaid on the preceding frame while the summary display area is kept as the background as it is.

3. The information display system according to claim 1 or 2, wherein the summary display area is enabled to disappear and can be displayed again.

4. An information display system capable of displaying an instruction input frame for allowing instructions of conditions of a desired processing job to be input therethrough and a status confirmation frame for allowing the status of an arbitrary processing job to be confirmed, characterized in that with the instruction input frame preferentially displayed, a processing job summary area that presents the summary of the processing job conditions displayed in the status confirmation frame can be displayed along with the instruction input frame.

5. The information display system according to claim 4, wherein the status confirmation frame includes as part thereof the processing job summary area as a processing job list area for briefly displaying the conditions of the arbitrary processing job while the instruction input frame is displayed so as to be overlaid on the status confirmation frame with the processing job list area kept as the background as it is.

6. The information display system according to claim 5, wherein the status confirmation frame is displayed at a fixed position.

7. The information display system according to claim 4, wherein the processing job summary area is displayed as a processing job-list area for briefly displaying the conditions of the arbitrary processing job in part of the instruction input frame.

8. The information display system according to claim 5 or 7, wherein icons representing the contents of processing jobs are displayed in the processing job list area.

9. The information display system according to claim 8, wherein icons representing the contents of processing jobs are displayed in the processing job list area in the order in which the processing jobs are to be executed.

10. The information display system according to claim 9, wherein when instructions of a new processing job are input through the instruction input frame and the new processing job is confirmed, an icon representing the new processing job is additionally displayed in the processing job list area.

11. The information display system according to claim 10, wherein icons displayed in the processing job list area are displayed in such a manner that an operator can know whether a job is being executed or before execution and that job is that which has been just additionally reserved.

12. The information display system according to claim 11, wherein when referring to the icon representing a processing job before execution as the basic form, the icon representing the processing job during execution is displayed by highlighting the basic form with black and white reversed and the icon representing the same job which has just been additionally reserved is displayed by flashing the basic form or by the rotation of the basic form.

13. The information display system according to claim 8, wherein when instructions of a new processing job are input through the instruction input frame and the new processing job is confirmed, an icon representing the new processing job is additionally displayed in the processing job list area.

14. The information display system according to claim 13, wherein icons displayed in the processing job list area are displayed in such a manner that an operator can know whether a job is being executed or before execution and that job is that which has been just additionally reserved.

15. The information display system according to claim 14, wherein when referring to the icon representing a processing job before execution as the basic form, the icon representing the processing job during execution is displayed by highlighting the basic form with black and white reversed and the icon representing the same job which has just been additionally reserved is displayed by flashing the basic form or by the rotation of the basic form.

16. The information display system according to claim 4, 5 or 7, wherein the processing job area can be made to disappear and appear again.

17. The information display system according to claim 4, wherein the instruction input frame can be made to disappear and can be displayed again even during execution of any processing job.

18. The information display system according to claim 4, wherein the instruction input frame is displayed necessarily when instructions of a new processing job are given.

19. The information display system according to claim 4, wherein, where there are multiple processing modes, the status confirmation frame displays the status of processing jobs for each processing mode.

20. An image forming apparatus including the information display system defined in claim 1 or 4.

21. The image forming apparatus according to claim 20, further having the function of being able to be connected to networks.

22. The image forming apparatus according to claim 21, having at least two functions of copy, facsimile and printer functions, wherein these functions can be changed one from another.

23. The image forming apparatus according to claim 22, further having a transmission function for enabling transmission and reception of information by way of facsimile via general telephone lines and e-mail via an internet.

24. The image forming apparatus according to claim 20, having at least two functions of copier, facsimile and printer functions, wherein these functions can be changed one from another.

* * * * *